US012223255B2

(12) United States Patent
Klein et al.

(10) Patent No.: US 12,223,255 B2
(45) Date of Patent: Feb. 11, 2025

(54) READING ASSISTANT IN A BROWSER ENVIRONMENT

(71) Applicant: GOOGLE LLC, Mountain View, CA (US)

(72) Inventors: Abigail Beth Klein, New York, NY (US); Joel Christopher Riley, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 25 days.

(21) Appl. No.: 17/931,283

(22) Filed: Sep. 12, 2022

(65) Prior Publication Data

US 2024/0086616 A1 Mar. 14, 2024

(51) Int. Cl.
*G06F 3/0485* (2022.01)
*G06F 3/0482* (2013.01)
*G06F 16/904* (2019.01)
*G06F 40/109* (2020.01)
*G06F 40/40* (2020.01)

(52) U.S. Cl.
CPC .......... *G06F 40/109* (2020.01); *G06F 3/0482* (2013.01); *G06F 3/0485* (2013.01); *G06F 16/904* (2019.01); *G06F 40/40* (2020.01)

(58) Field of Classification Search
CPC .... G06F 40/109; G06F 3/0482; G06F 3/0485; G06F 40/40; G06F 16/904; G06F 16/954; G06F 16/95; G06F 40/103
See application file for complete search history.

(56) References Cited

U.S. PATENT DOCUMENTS 6,047,252 A * 4/2000 Kumano ................. G06F 40/58
704/5
8,819,028 B2 * 8/2014 Luo ....................... G06F 16/986
715/241

(Continued)

OTHER PUBLICATIONS

"This is Firefox's redesigned Reader Mode", Techdows (https://techdows.com/2020/05/this-is-firefoxs-redesigned-reader-mode.html), May 13, 2020, 9 pages.

(Continued)

*Primary Examiner* — Kieu D Vu
*Assistant Examiner* — Blaine T Basom
(74) *Attorney, Agent, or Firm* — Brake Hughes Bellermann LLP

(57) ABSTRACT

A reading assistant tool implemented in a browser application facilitates the presentation of text content in a manner and format that addresses the reading and/or comprehension capabilities of individual users, while maintaining the context of the original content. The reading assistant tool outputs a reader view pane alongside a main content pane. Original content is presented in the main content pane, and simplified/reformatted content corresponding to text content extracted from the original content, is presented in the reader view pane. Scrolling of the extracted text content in the reader view pane is synchronized with scrolling of the original content in the main content pane, so that context is maintained as the user moves through the content. The concurrent presentation of the original content and the extracted text content allows the user to more easily consume the extracted text content, while also maintaining context as originally intended.

15 Claims, 16 Drawing Sheets

(56) References Cited

U.S. PATENT DOCUMENTS

| | | | | |
|---|---|---|---|---|
| 9,007,405 | B1* | 4/2015 | Eldar | G06F 16/9577 345/666 |
| 9,152,730 | B2* | 10/2015 | Bignert | G06F 16/353 |
| 9,355,079 | B2* | 5/2016 | Harrison | G06F 40/134 |
| 9,418,061 | B2* | 8/2016 | Ittycheriah | G06F 40/55 |
| 9,563,334 | B2* | 2/2017 | Melton | G06F 16/345 |
| 2005/0160360 | A1* | 7/2005 | Nadamoto | G06F 16/954 715/264 |
| 2011/0119571 | A1* | 5/2011 | Decker | G06F 16/9577 715/205 |
| 2012/0015694 | A1* | 1/2012 | Han | G06F 16/9577 455/566 |
| 2012/0096341 | A1* | 4/2012 | Suga | G06F 3/1246 715/234 |
| 2013/0238978 | A1* | 9/2013 | Jwa | G06F 16/9577 715/234 |
| 2016/0055196 | A1* | 2/2016 | Collins | G06F 16/93 707/690 |
| 2017/0365083 | A1 | 12/2017 | Hartrell et al. | |
| 2019/0129977 | A1* | 5/2019 | Kikushima | G06F 40/103 |
| 2021/0004526 | A1* | 1/2021 | Kahn | G06F 16/84 |
| 2021/0097134 | A1* | 4/2021 | Livshits | G06F 40/143 |
| 2021/0224013 | A1* | 7/2021 | Kim | G06F 3/147 |
| 2021/0248153 | A1 | 8/2021 | Sirangimoorthy et al. | |
| 2021/0365521 | A1 | 11/2021 | Yusuf et al. | |

OTHER PUBLICATIONS

Kumar, "Making the web more accessible and inclusive for all with Microsoft Edge", Microsoft Windows Blogs (https://blogs.windows.com/windowsexperience/2020/05/21/making-the-web-more-accessible-and-inclusive-for-all-with-microsoft-edge/), May 21, 2020, 8 pages.
International Search Report and Written Opinion for PCT Application No. PCT/US2023/070815; mailed on Oct. 5, 2023, 11 pages.

* cited by examiner

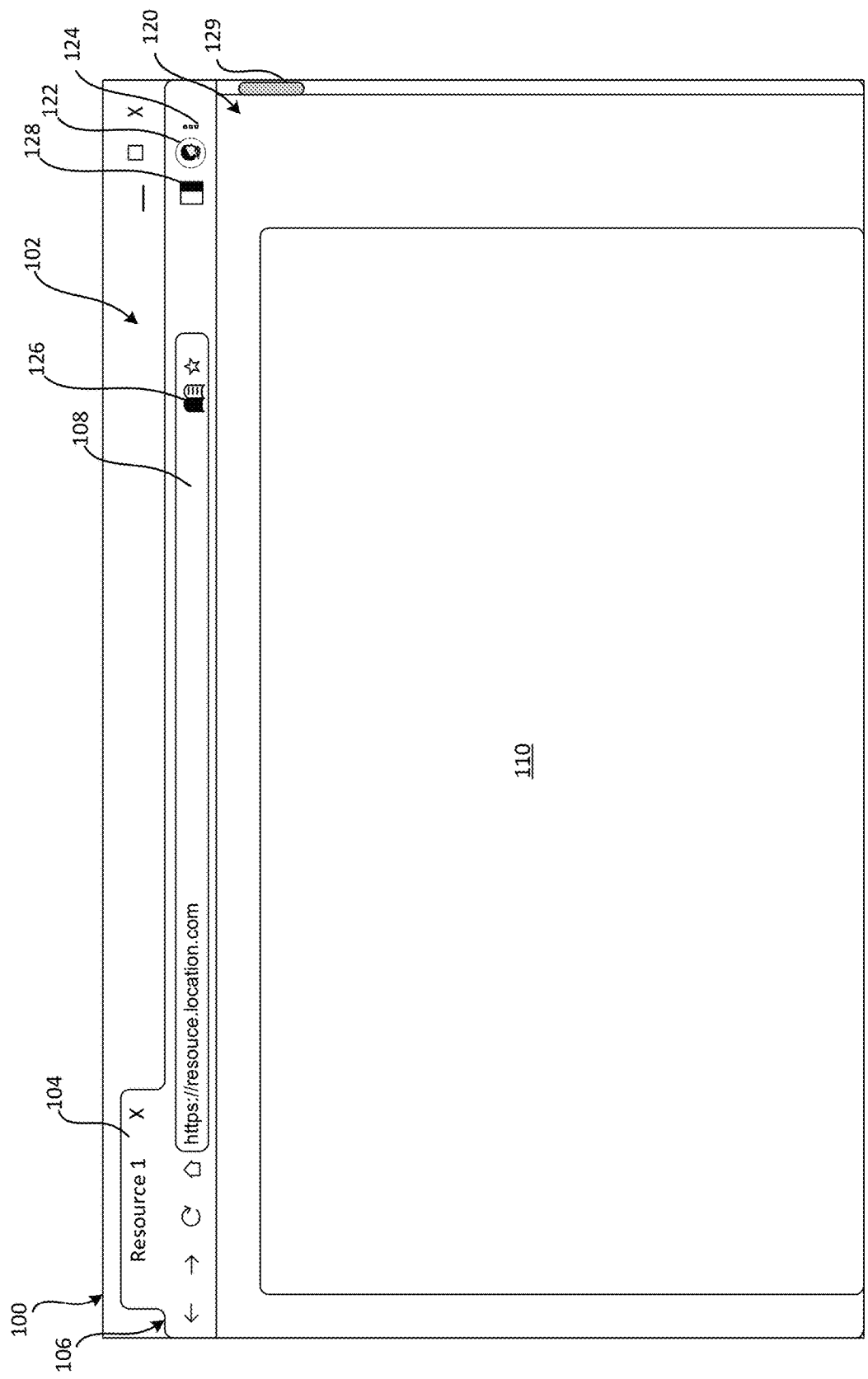

FIG. 3H

READING ASSISTANT IN A BROWSER ENVIRONMENT

TECHNICAL FIELD

This description relates in general to a reading assistant tool for a computing device, and in particular, to a reading assistant tool that allows a user to maintain the context of the original content while also facilitating the consumption of the content by the user.

BACKGROUND

Some users face challenges in reading and/or comprehension and/or learning and/or language. For example, conditions such as dyslexia, attention deficit disorder, and other such conditions may affect the user's ability to focus on, process, and/or comprehend content such as, for example, content available via web-based applications, web-based sources and the like. Existing reading modes replace the content with simplified content, e.g., providing a simplified output, or presentation of text-intensive content.

SUMMARY

Systems and methods, in accordance with implementations described herein, provide a reading assistant tool that enhances the reading experience and the comprehension of web-based content. The reading assistant tool provides for the presentation of text content in a manner and format that addresses the reading and/or comprehension capabilities of individual users, while maintaining the context of the original content. The reading assistant tool may be implemented in a browser application, to include a browser-based operating system. This may make the reading assistant tool available for substantially any content output by the browser application/browser-based operating system. The reading assistant tool may output a reader view that provides a modified, or simplified version of original content. The reading assistant tool may cause a reader view pane to be output together with, i.e., beside/adjacent, a main content pane, with the original content presented in the main content pane, and the modified, or simplified content presented in the reader view pane. The modified, or simplified content may include text content that has been extracted from the original content. The presentation of the extracted text content can be customized, or modified, or reformatted, in accordance with user settings, or preferences, to address the needs of a particular user. The concurrent presentation of the original content in the main content pane and the extracted text content in the reader view pane may enable the user to more easily consume the extracted text content, while also maintaining context as originally intended due to the concurrent presentation (in one example, side by side placement) with the original content. Scrolling of the extracted text content may be synchronized with, or anchored with, scrolling of the original content, so that this continuity and context is maintained as the user moves through the content.

The details of one or more implementations are set forth in the accompanying drawings and the description below. Other features will be apparent from the description and drawings.

BRIEF DESCRIPTION OF THE DRAWINGS

FIGS. 1A and 1B illustrate example browser application user interfaces, in accordance with implementations described herein.

FIGS. 3F-3H illustrate features of a reader view generated by the reading assistant tool and presented in a browser content window of the example browser application user interface shown in FIG. 3A.

DETAILED DESCRIPTION

Figure 1B:
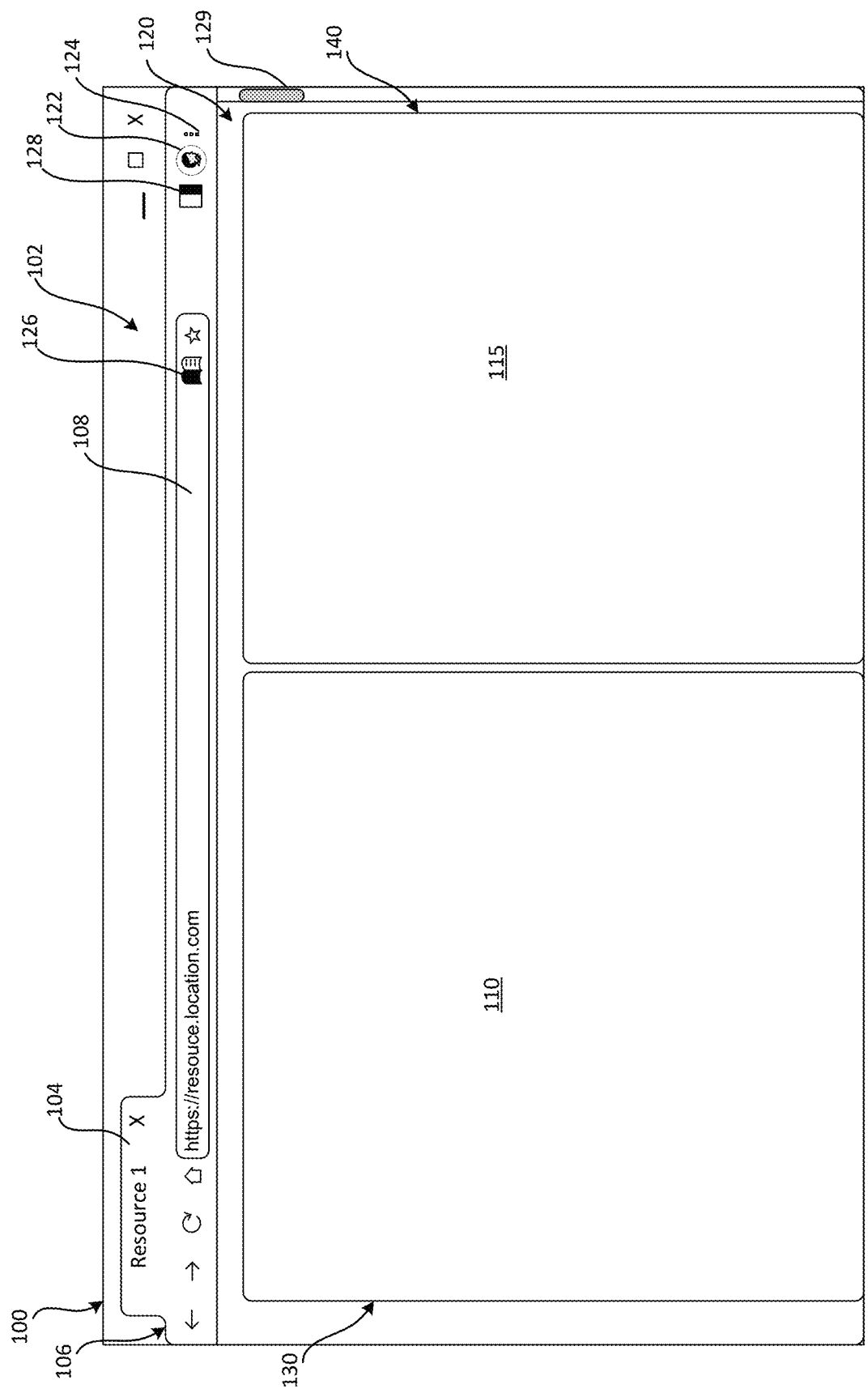

Web-based content can include numerous content items (i.e., text content, image content, promotional/advertising content, links, browser control devices, text entry fields, and the like). The arrangement of different types of content items may make the web-based content difficult to consume, particularly by users having reading and/or comprehension challenges. Existing reading modes can be somewhat limited in their ability to distill content, i.e., text content, which is output in forms other than typical text content structure (i.e., articles, blogs and the like). Further, existing reading modes can often lose connection to the original content in the process of distilling the text content into a reading view. Thus, some of the context as originally intended by the author/publisher, and some level of understanding of the content, may be lost by some users. A readily available reading assistant tool that is effective in distilling content in various different forms, and that allows the user to maintain context with the original content while consuming the distilled content, may improve the content consumption experience, particularly for users with reading and/or comprehension and/or learning and/or language challenges. Systems and methods, in accordance with implementations described herein, relate to tools that provide for improved reading and comprehension of content output by a computing device. These tools can provide for the customization of how content is presented, or output, to accommodate the unique reading and/or comprehension and/or learning and/or language capabilities and the like of a particular user. In some examples, customization of the content can include, for example, decluttering of the content to eliminate superfluous content items that are not pertinent to the reading and comprehension of the content. In some examples, customization can include, for example, modification of an appearance of text content including, for example, font type, font size, font color, background color, pitch, spacing, and other such elements which may facilitate the consumption and comprehension of the text content by the user. Systems and methods, in accordance with implementations described herein, may improve accessibility to a wide range of content, for a wide range of users, by accommodating the reading and/or comprehension and/or learning and/or language capabilities of a wide range of users, and for an extensive range of content. Accessibility may be further improved by making the reading assistant tool easily and readily available to the user, via a browser, so that the reading assistant tool is available across a broad range of resources.

In some examples, the original, unmodified content can be output in a first pane, and the customized content, including text content that has been reformatted, or having an appearance that has been modified to facilitate consumption by a particular user, can be output in a second pane displayed next to the first pane. Output of the customized and/or reformatted text content in a second pane, alongside the first pane displaying the original, unmodified content, may provide and/or maintain context for the customized and/or reformatted text content. For example, content items such as images and the like, that were eliminated in the decluttering of the original content, may be visible concurrently with the text content that has been customized and/or reformatted for ease of user consumption. Scrolling of the customized and/or reformatted text content output in the second pane can be synchronized with scrolling of the original, unmodified content output in the first pane, to retain context as the user scrolls through the content. In some situations, the original content may be output in a form that is not easily distillable. Thus, in some examples, systems and methods, in accordance with implementations described herein, may provide for the selection of a portion of the original content to be customized, or reformatted, as described above, and the customized and/or reformatted, text content to be output in a second pane as described above.

The presentation of the original, unmodified content alongside the modified text content can help the user in retaining context, while also helping to ensure that publisher intent is not lost when modifying the text content. Customization of the output of content in this manner, based on the user's reading and/or learning and/or language capabilities, can enhance user focus and/or facilitate user comprehension of the content, and improve accessibility to content to a broad range of users with varying levels of reading and/or comprehension and/or language skills.

Systems and methods, in accordance with implementations described herein, can be incorporated into the operating system of a computing device. This may make the capability to customize the output of content in this manner available to the user of the computing device across a broad range of web-based interfaces/applications, in multiple separate browser processes, without the use of third party applications.

In some examples, the user may be provided with controls allowing the user to make an election as to both if and when systems, programs, or features described herein may enable collection of user information. Such user information may include, for example, information related to the user's reading and/or learning and/or comprehension and/or language skills associated with the use of the systems and methods, information related to the user's student/professional status, information related to the user's social network, social actions, or activities, the user's current location, and other such information. In some examples, the user information may include information related to the source of content (for example, content to be modified, or other content) and/or communications, such as content or communications from a server. In addition, some data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. In some examples, personal information including settings and/or preferences related to the modification of content, associated with the user's reading and/or comprehension and/or learning and/or language skills, may be treated before it is stored or used so that such information cannot be associated with a particular user. Thus, the user may have control over what information is collected about the user, how that information is used, and what information is provided to the user.

FIG. 1A illustrates an example browser interface (UI) 100, in accordance with implementations described herein. In some examples, the UI 100 is generated and rendered by a browser application executing in an operating system of a computing device. The example UI 100 includes a tab strip 102 associated with the browser application. In this example, the UI 100 includes a browser tab 104, simply for purposes of discussion and illustration. The UI 100 can include any number of browser tabs and/or tab groups that can be opened by the browser application. Content 110 (e.g., web content, a web page, an online resource, a web application, and the like) may be presented in a corresponding browser content window 120 of the browser application. In some examples, content 110 may be rendered by the browser application, which may be generated or served at least partially by and/or from an external resource such as, for example, a server including for example a server hosting a website, web application, or other external resource. In some examples, content as used herein can include resources associated with a resource identifier including, for example, URLs (Universal Resource Locators), URIs (Universal Resource Identifiers), and the like. Content may refer to a web page (resource) currently rendered in the browser content window 120, as well as other data (for example, metadata) that is used in rendering (for example, markup and scripts that are not actually displayed), models generated for rendering the content 110 (for example, document object models, accessibility models and the like).

The example UI 100 includes an address bar area 106. An address of the web page displayed in the browser content window 120 can be shown in the address bar area 106. A resource identifier for desired content can be input (for example by the user) into an address input area 108 in the address bar area 106. Other controls, icons, and the like can be included in the address bar area 106. For example, a user icon 122 may be displayed in the address bar area 306 to provide an indication of a user account or a user profile associated with the browser session. The user icon 122 can be an image, text, or some other representation of the user account. Other controls and/or icons can include, for example, a forward control, a back control, a refresh control, a home control, an extensions control, a saved location control, a utility menu control icon 124, and other such controls and/or icons. In some examples, a scroll control icon 129 may be provided along one or more peripheral portions of the browser content window 120. User manipulation of the scroll control icon 129 may cause content 110 presented in the browser content window 120 to scroll in a direction corresponding to the user manipulation of the scroll control icon 129. In some examples, a reading assistant control icon 126 can be included in the address bar area 106. In some examples, the reading assistant control icon 126 can be present within the address input area 108, or other portion of the address bar area 106. The reading assistant control icon 126, when selected by the user, can launch a reading assistant tool. The reading assistant control icon 126 may be just one manner in which the reading assistant tool can be launched. In some examples, a side panel control icon 128 can be included in the address bar area 106. The side panel control icon 128, when selected by the user, may cause a side panel, or a second viewing pane to be presented in the browser content window 120, as shown in FIG. 1B.

As shown in FIG. 1B, in some examples, selection of the reading assistant control icon 126 may launch the reading assistant tool and cause a first pane 130 and a second pane 140 to be displayed in the browser content window 120. In some examples, the original, unmodified content 110 may be displayed in the first pane 130. In some examples, modified content 115, generated by the reading assistant tool based on the original, unmodified content 110, may be displayed in the second pane 140. In some examples, the modified content 115 may be generated based on user settings and/or preferences. The user settings and/or preferences may be based on various factors such as, for example, the user's learning style, reading/comprehension capabilities, language skills, and the like. As noted above, modification of the original content 110 to generate the modified content 115 for presentation in the second pane 140 may include decluttering, such as, for example, removal of images and the like, such that the remaining text content is presented in the modified content 115. Modification of the remaining text content can include modifications in font size and/or style and/or color, spacing, pitch, background color, and the like. In some examples, scrolling of the modified content 115 in the second pane 140 may be synchronized with scrolling of the original content 110 in the first pane 130. Positioning of the modified content 115 in the second pane 140, alongside the original content 110 in the first pane 130, and the synchronized scrolling of the modified content 115 and the original content 110, may allow the user to maintain context with the original content 110 while consuming/reading the modified content 115, which has been modified to adapt to the particular capabilities of the user.

In some examples, selection of the side panel control icon 128 may cause the first pane 130 and the second pane 140 to be displayed in the browser content window 120 as shown in FIG. 1B. In some examples, the reading assistant control icon 126 may be available to the user in one or both of the first pane 130 or the second pane 140. User selection of the reading assistant control icon 126 from, for example, the second pane 140, may launch the reading assistant tool. In this situation, the original, unmodified content 110 may be presented in the first pane 130, and the modified content, generated by the reading assistant tool as described above, may be presented in the second pane 140.

Figure 2:
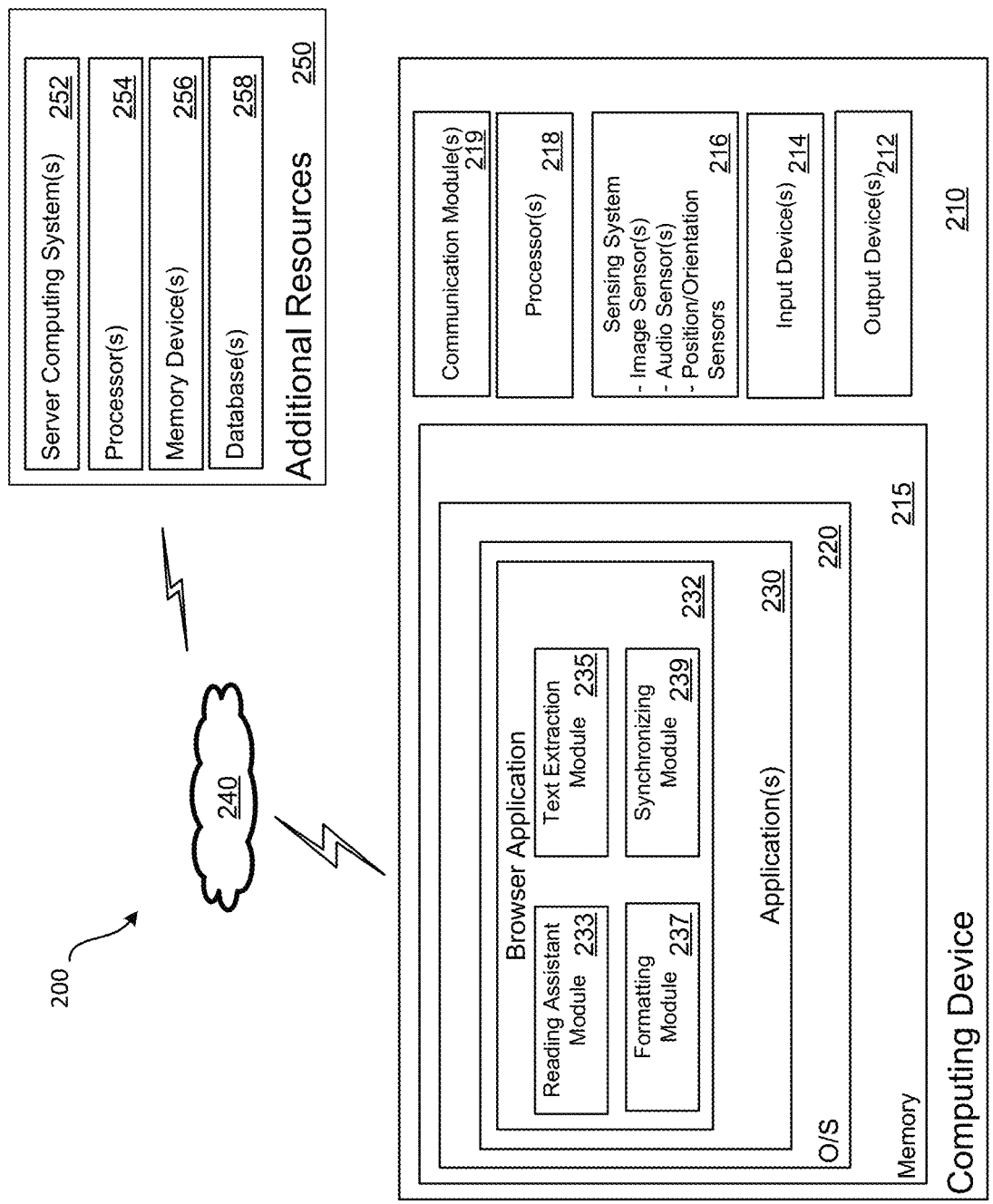
FIG. 2 is a block diagram of a system, in accordance with implementations described herein.

FIG. 2 is a block diagram of an example system 200 for providing a reading assistant tool in a browser application, according to an aspect. The system 200 includes a computing device 210 including an operating system 220. The computing device 210 may also be referred to as a client computing device or a client device. In some examples, the computing device 210 may be, for example, a personal desktop computing device, a personal laptop computing device, a tablet computing device, a smart phone, a wearable computing device (for example, smart glasses, a smart watch, and the like), and other such computing devices that include image output capability. The computing device 210 can include one or more output device(s) 212 that enable the user to view visual content and/or receive audio content. Example output devices 212 may include, for example, a display device (for example, a monitor, a touchscreen, and the like) that enables a user to view and/or interact with displayed content, an audio output device (for example, a speaker, and the like). The computing device 210 can include one or more input devices 214 that allow a user to, for example, interact with content output by the computing device 210, input commands for execution by the computing device 210, and the like. Example input devices 214 may include, for example, a keyboard, a mouse, a touch-sensitive display, a trackpad, a trackball, and the like. In some examples, the input device(s) 214 may include an audio input device (for example, a microphone) that detects audio signals for processing by the computing device 210 as a user input. In some examples, one or more sensing devices of a sensing system 216 may serve as input device(s) 214. For example, one or more image sensor(s) may detect user gesture inputs for processing as user inputs by the computing device 210. One or more position sensor(s) may detect user gesture inputs (i.e., changes in position and/or orientation of the computing device 210) for processing as user inputs by the computing device 210.

The computing device 210 may include one or more processors 218. The one or more processors 218 may be implemented as a CPU and/or GPU formed in a substrate configured to execute one or more machine executable instructions or pieces of software, firmware, or a combination thereof. The one or more processor(s) 218 may be semiconductor-based processors that include semiconductor material that can perform digital logic. The computing system can include one or more communication modules 219 that provide for communication between the computing device 210 and other external systems and resources. The computing device 210 may include one or more memory devices 215. The memory device(s) 215 may include a main memory that stores information in a format that can be read and/or executed by the one or more processor(s) 218. The memory devices 215 may store applications or modules such as, for example, the operating system 220, one or more applications 230 including a browser application 232, and the like, that, when executed by the one or more processor(s) 218, perform certain operations.

The operating system 220 may be implemented in system level software that manages computing system hardware and software resources, and provides common services for computing programs executed by the computing device 210. In some examples, the operating system 220 is operable to run on a personal computing device such as a laptop computing device, a desktop computing device, a convertible computing device, and the like. In some examples, the operating system 220 is operable to run on a mobile computing device such as a tablet computing device, a handheld computing device (such as a smartphone), a wearable computing device (such as smart glasses, a smart watch), and the like. The operating system 220 may include a plurality of modules that can provide common services and manage resources of the computing device 210.

As noted above, the computing device 210 may include one or more applications 230 that represent programmed software co performing different functions. One of the applications 230 may be the browser application 232. The browser application 232 may display web pages, execute web applications, and the like. In some examples, the browser application 232 may include additional functionality in the form of extensions. In some examples, the browser application 232 may also be the operating system 220 of the computing device 210. The browser application may generate and output user interfaces such as the example UI 100 shown in FIGS. 1A and 1B. The browser application 232 may include one or more modules that can facilitate functionality of the browser application 232. In the example shown in FIG. 2, in which the example system 200 includes a reading assistant tool, the browser application 232 may include, for example, a reading assistant module 233, a text extraction module 235, a formatting module 237, a synchronizing module 239, and other such modules that may facilitate operation of the reading assistant tool via the browser application 232.

In response to launching the reading assistant module 233, the reading assistant module 233 the text extraction module 235 may be accessed, to analyze content output by the computing device 210. The text extraction module 235 may include one or more models, for example, machine learning models, trained and configured to analyze content (for example, a web page, a document, or other such content) accessed by the computing device 210 and output by one of the output devices 212. In some examples, the text extraction module 235 may be configured to analyze the content to detect attributes associated with text content such as, for example, headings, paragraphs, and other such attributes associated with text content, and extract the text content the content output by the computing device 210. The formatting module 237 may organize the text content extracted by the text extraction module into a modified form that is more easily consumed by the user. For example, the formatting module 237 may apply user settings and/or preferences to the extracted text content to make the text content more easily consumable by the user. The user settings and/or preferences may include, for example, selected font type and/or size and/or color, pitch, spacing, to be applied to generate modified text content to be output by the computing device 210. In some examples, the user may choose to save preferences for formatting of the modification of text content to a user profile or account, accessible to the formatting module 237, to eliminate selection of user preference each time text content is to be extracted and modified.

As described above, the modified text content may be output by the computing device 210 alongside the original content, as in the example shown in FIG. 1B, including the first and second panes 130, 140. The synchronizing module 239 may control the scrolling of the original, unmodified content and the modified content, presented side by side, so that scrolling is synchronized between the original, unmodified content and the modified content. This may allow the user to maintain a connection between the original, unmodified content and the modified content, and retain context with the original, unmodified content, for example, as intended by the publisher. Retention of the context in this manner may improve the user's comprehension of the content.

In some examples, content can be provided to the computing device 210 from additional resources 250 accessible to the computing device 210. In some examples, the additional resources 250 are accessible to the computing device 210 via a network 240. In some examples, the additional resources are available locally, on the computing device 210. In some examples, some of the additional resources 250 are available to the computing device 210 via the network 240, and some of the additional resources are available locally on the computing device 210. In some examples, resources associated with one or more of the reading assistant module 233, the text extraction module 235, the formatting module 237 and/or the synchronizing module 239 may be available in the additional resources 250. In some examples, the additional resources 250 may include, for example, one or more server computing systems 252, one or more processors 254, one or more memory devices 256, and one or more databases 258. The one or more server computing systems 252 may include one or more computing devices including, for example, a standard server, a group of such servers, a rack server system, and the like. In some examples, content may be accessible to the computing device 210 from, for example, one or more of the server computing systems 252 available via the additional resources 250. Content may include, for example, web based content including content available via websites and the like.

Figure 3A:
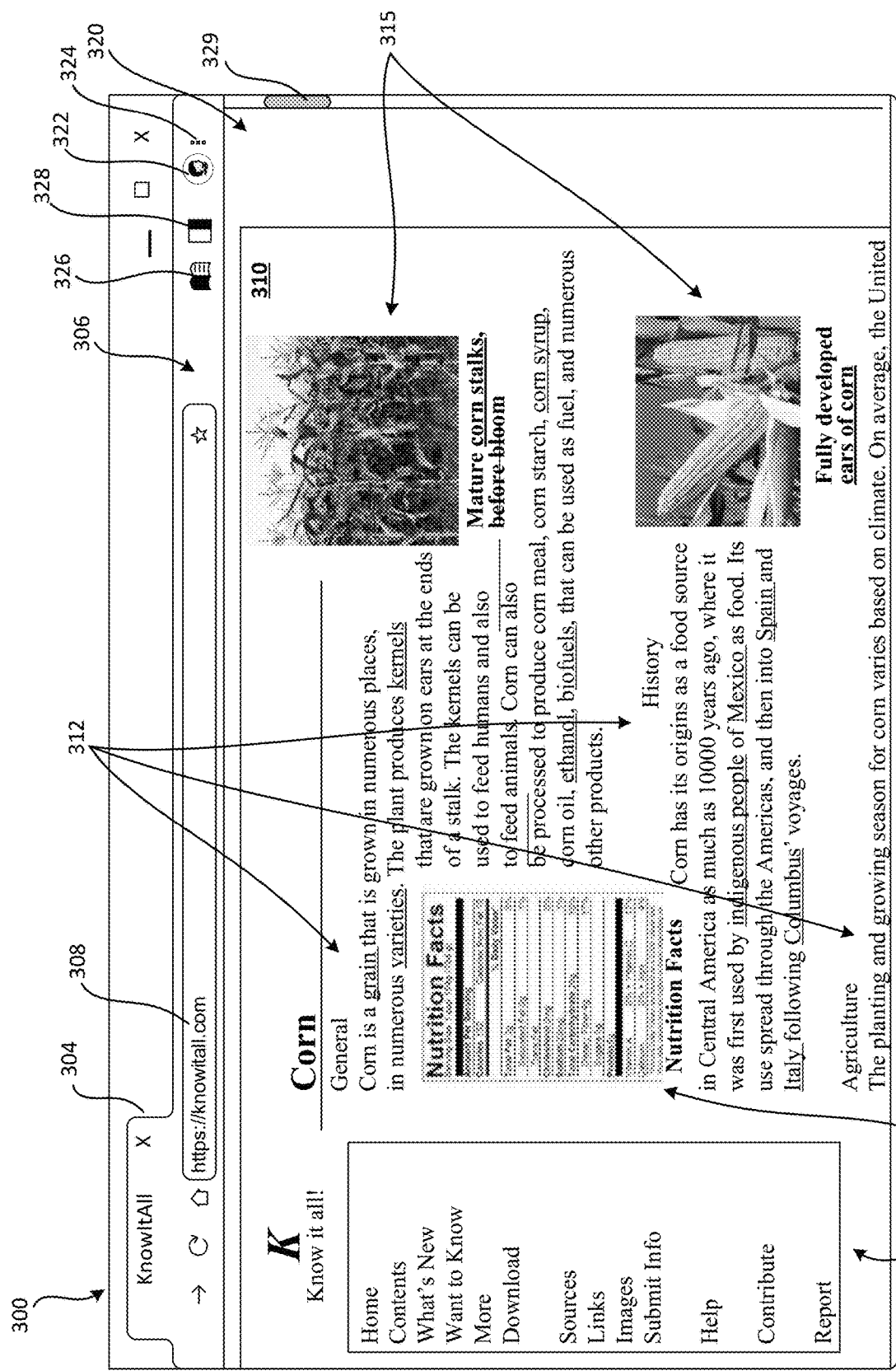
FIG. 3A illustrates an example browser application user interface including content displayed in a browser content window.

FIG. 3A illustrates an example browser interface (UI) 300, in accordance with implementations described herein. The example UI 300 may be generated and rendered by a browser application (for example, the browser application 232 described above with respect to FIG. 2, or other such browser application) executing in an operating system (for example, the operating system 220 described above with respect to FIG. 2, or other such operating system) of a computing device (for example, the computing device 210 described above with respect to FIG. 2, or other computing device). Hereinafter, systems and methods will be described with respect to the system 200 including the example computing device 210 described above with respect to FIG. 2, simply for purposes of discussion and illustration. The systems and methods to be described herein may be implemented by other computing systems having similar components, arranged similarly or differently than described above with respect to FIG. 2.

In this example, the UI 300 includes one browser tab 304, simply for purposes of discussion and illustration. In this example, browser content 310 in the form of an article provided in a web page, is presented in a browser content window 320 associated with the browser tab 104. In some examples, the browser content 310 may be provided by, for example, the additional resources 250 (for example, a server hosting a website or web application) described above with respect to FIG. 2, and rendered by the browser application for output by the computing device. The example UI 300 shown in FIG. 3A includes an address bar area 306, with the address (i.e., the URL) of the web page displayed in the browser content window 320 shown in an address input area 308 of the address bar area 306. In the example shown in FIG. 3A, a user icon 322 is displayed in the address bar area 306. The user icon 322 may identify a user account, or a user profile, associated with the current browser session. A utility menu control icon 324 may provide for access to secondary actions and tools. In some examples, a scroll control icon 329 may be provided along one or more peripheral portions of the browser content window 320. User manipulation of the scroll control icon 329 may cause content 310 presented in the browser content window 320 to scroll in a direction corresponding to the user manipulation of the scroll control icon 329.

In some examples, a reading assistant control icon 326 can be included in the address bar area 306, for example, in the address input area 308 or other portion of the address bar area 306. Selection of the reading assistant control icon 326 is one way in which the reading assistant tool can be launched. In some examples, a side panel control icon 328 can be included in the address bar area 306. Selection of the side panel control icon 328 may cause a side panel, or a second viewing pane, to be presented in the browser content window 320. In some examples, the reading assistant tool can be launched via selection of the side panel control icon 328. That is, in some examples, the reading assistant control icon 326 can be included in the side panel presented in response to selection of the side panel control icon 328, so that the reading assistant tool can be launched from within the side panel.

In the example shown in FIG. 3A, example browser content 310, in the form of an article presented in a web page, is presented in the browser content window 320. The example content 310 includes text content 312, image content 315, and tabular content 318 arranged in the browser content window 320. In this example, the image content 315 includes images presented within the content 310, located proximate to the text content 312 to which they are related. The tabular content 318 includes menu items, or links, providing access to additional information related to the content 310 presented in the browser content window 320. Users, particularly users experiencing reading and/or comprehension and/or learning and/or language challenges, may find the content 310 difficult to consume in the form in which it is presented in the example browser content window 320 shown in FIG. 3A. The text content 312 is arranged in section or paragraph form, with headings identifying the start of the sections. The sections of text preceded by headings may be detectable by a text extraction module, such as, for example, the text extraction module 235 described above with respect to FIG. 2, identifying at least that portion of the content 310 as text content 312. This may allow the text extraction module 235 to relatively easily segregate the text content 312 from the image content 315, the tabular content 318, icons representing browser control devices, links, text entry fields, and any other content that may be presented in the browser content window 320 that is not clearly/easily extractable text content.

In general, browser content can include text content, image content, tabular content, links, input fields, browser control devices, and other types of content. In some examples, text-intensive sections of web-based content may be identified as main content intended for consumption by a user. The text extraction module 235 may identify main content based on, for example, text characters arranged in headings, paragraphs, sentences and the like. Text content extracted from these text-intensive sections (main content) by the text extraction module 235 may be processed by the reading assistant tool to produce modified, or simplified text content, which is more easily consumable by the user. A web page including mainly text-intensive content, for example in which a majority of the content of the page is text-intensive content, may be considered a distillable page. In contrast, a web page including content such as the tabular content 318, icons, browser control devices, text entry fields and the like may be considered a non-distillable page. Even though some of these content items may include some text (for example, characters, words, short phrases identifying the content item and the like), extraction of that text and presentation may not produce useful results to the user. In some implementations, a machine learning model may be used to determine whether the web page is considered a distillable page. The machine learning model may be trained, e.g., using supervised or semi-supervised training, to take an accessibility tree (e.g., nodes of the tree) as input and provide as output an indication of which nodes (if any) can be considered main content and/or a prediction of whether the web page is a distillable page.

Figure 3B:
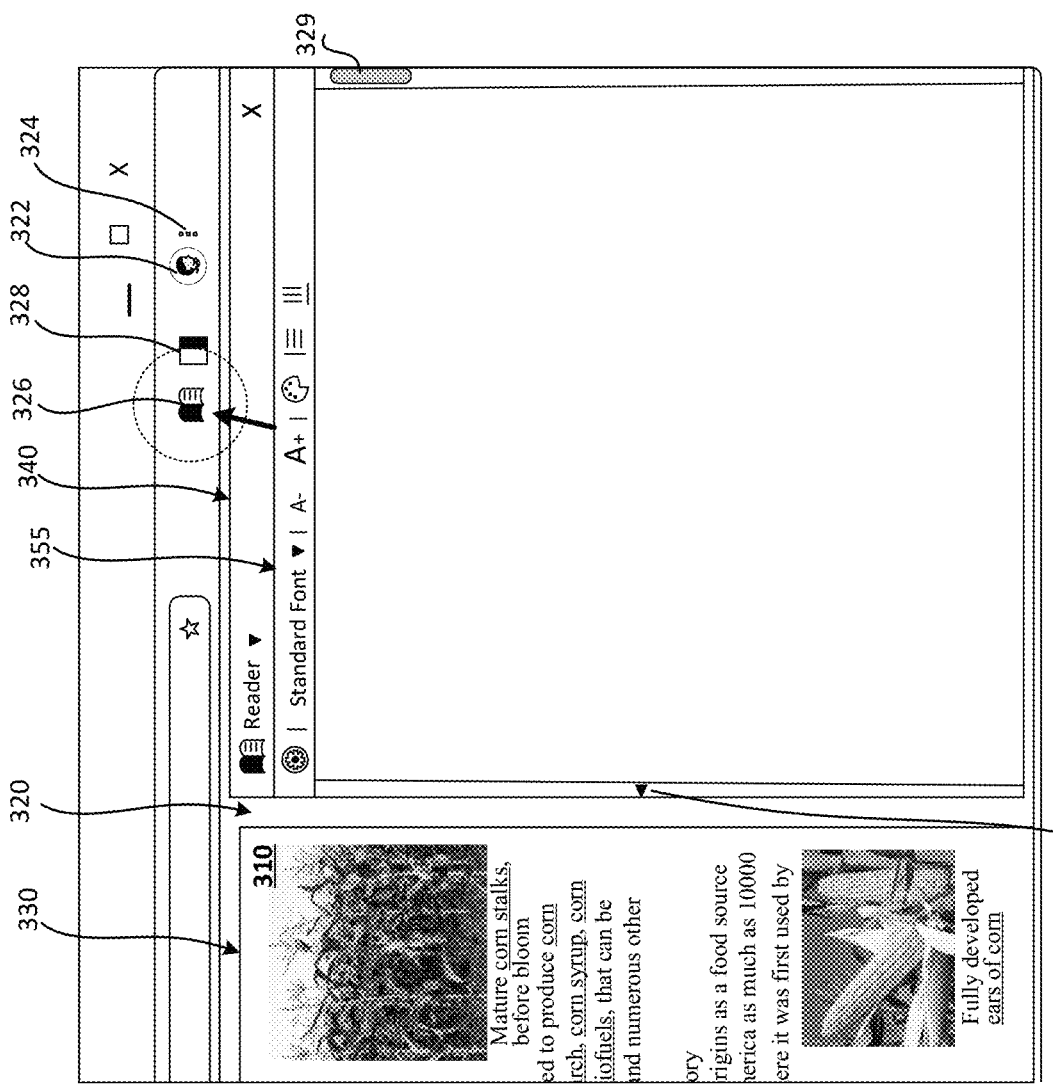
FIGS. 3B-3E illustrate example alternatives for launching of a reading assistant tool in the example browser application user interface shown in FIG. 3A.
Figure 3C:
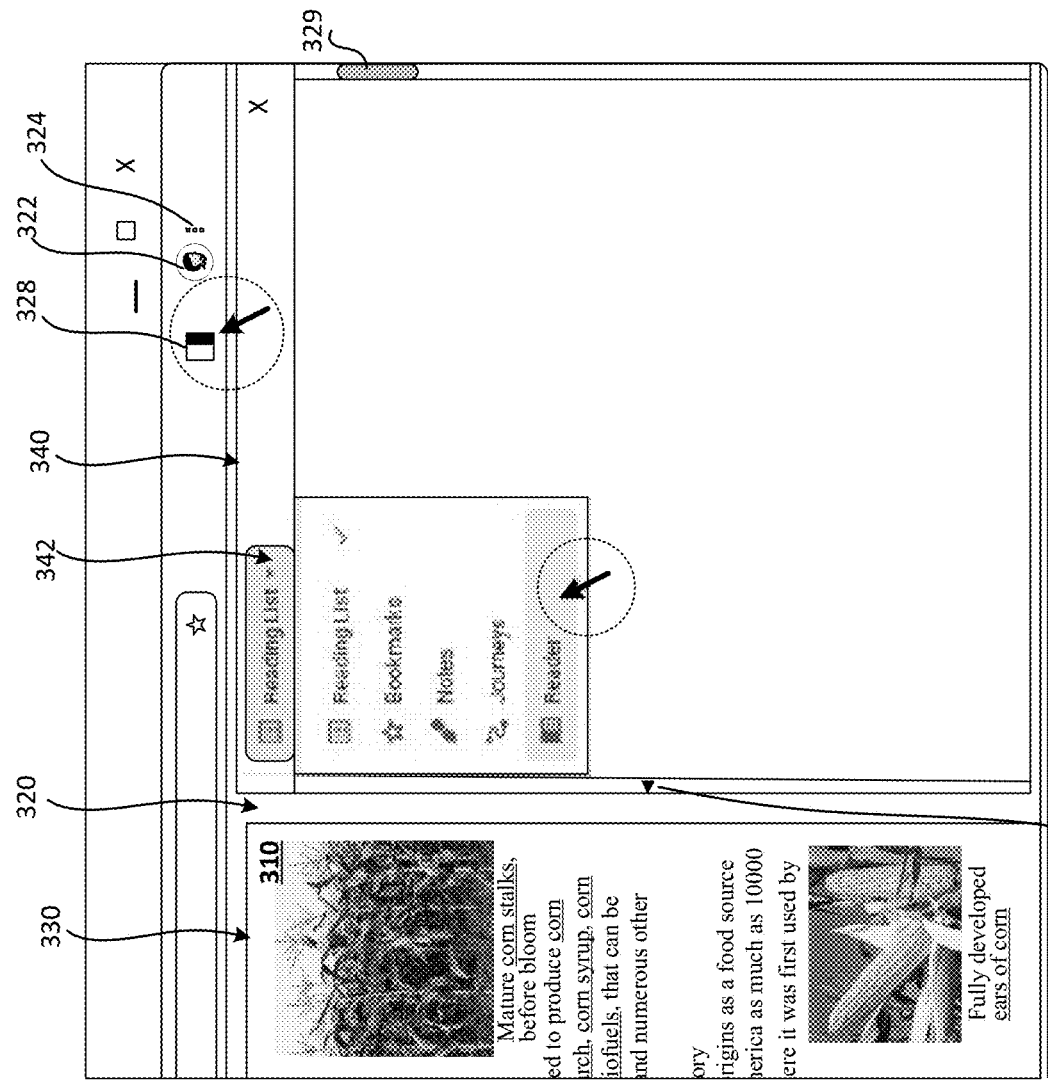
Figure 3D:
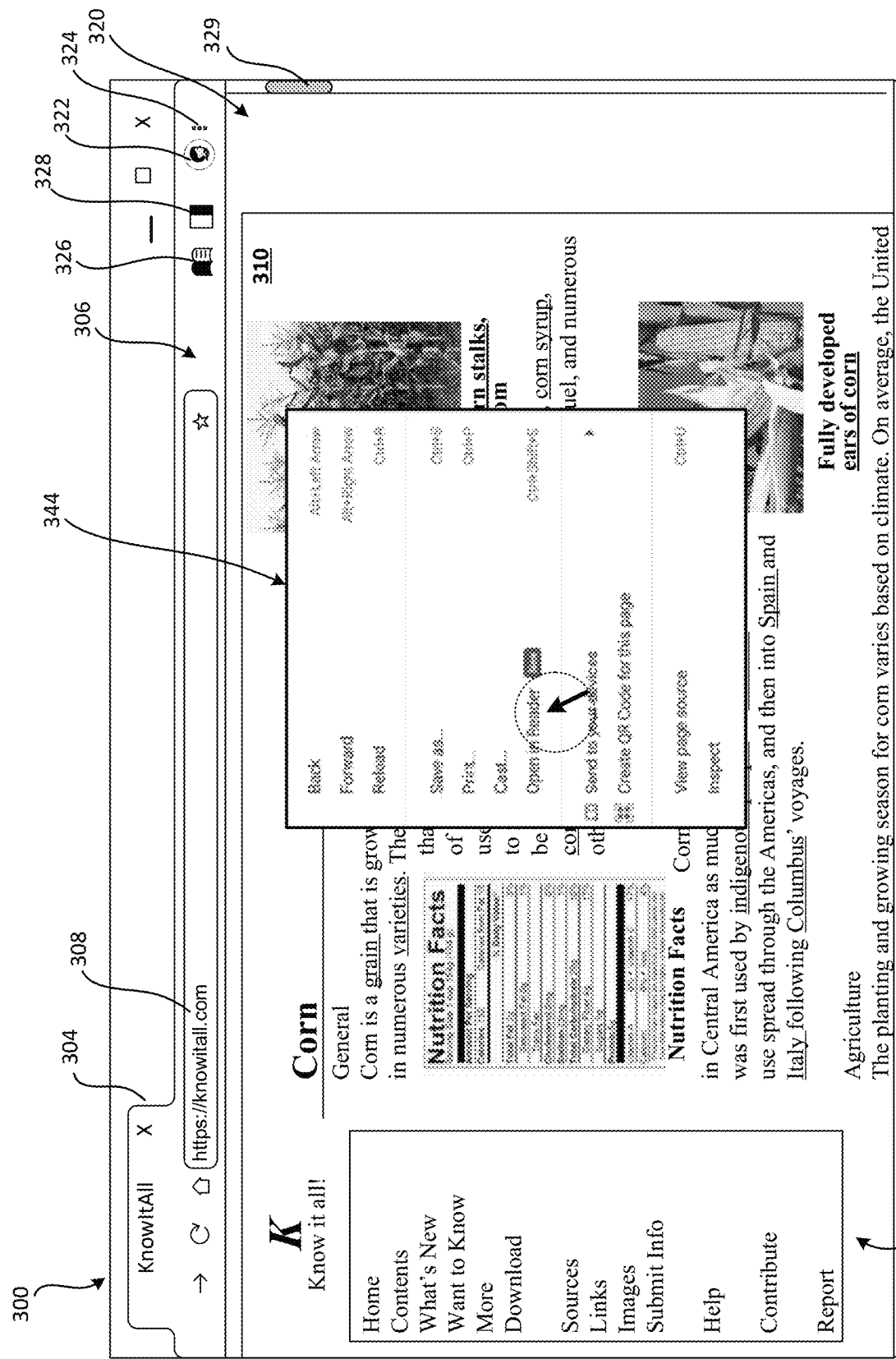
Figure 3E:
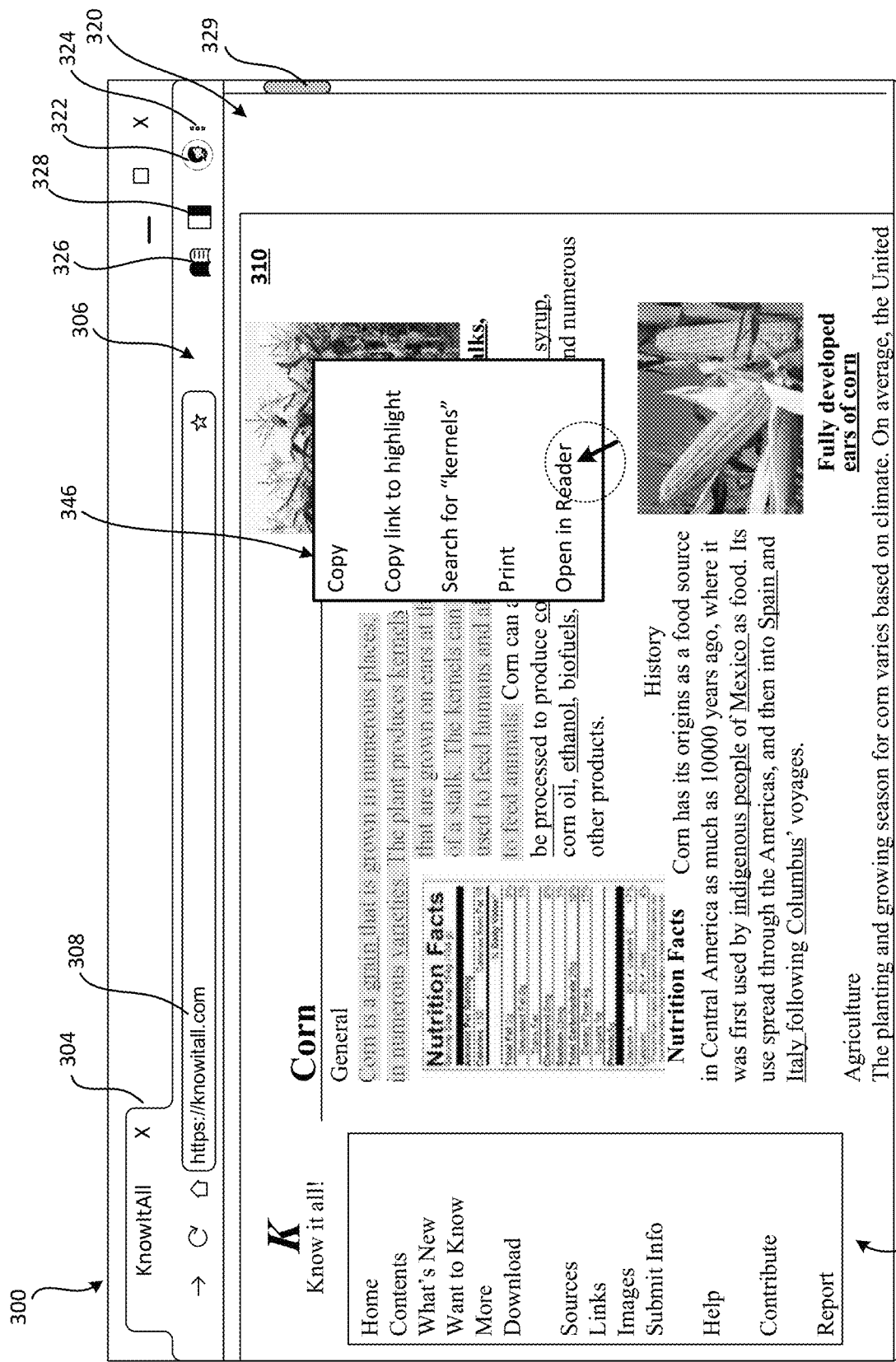

As set forth above, the user may wish to consume content, such as the example content 310 shown in FIG. 3A, in a form that is tailored, or customized, for the user's preferences and capabilities for viewing, reading, and comprehension, so that the content 310 is more easily consumed and understood. Accordingly, the user may choose to launch the reading assistant tool to distill the content 310. In some examples, a page type associated with the web page content presented in the example web browser UI 300 may be determined, to determine that the example content 310 includes distillable content. The web page presented in the example browser UI 300 may be determined to be a distillable page, based on the identification of sections of text content 312. The detection can be determined by a machine learning model. The user may launch the reading assistant tool in a number of different ways from within the browser. In some examples, the reading assistant tool may be launched in response to user selection of the reading assistant control icon 326. As shown in FIG. 3B, selection of the reading assistant control icon 326 may launch the reading assistant tool in a side panel positioned beside, or alongside, a main panel in which the content 310 is displayed. In other words, the original content 310 may be displayed in a first content pane 330 presented in the browser content window 320, and the side panel may represent a second pane in which other content, including modified content generated based on the original content 310, may be presented. In some examples, the reading assistant tool may be launched in response to user selection of the side panel control icon 328 and user selection of the reading assistant control icon 326 from a menu 342 available in the resulting side panel, as shown in FIG. 3C. In some examples, the reading assistant tool may be launched in response to user selection of the reading assistant tool from a menu 344 displayed in response to an input from an input device (i.e., a right click on a mouse, a tap on a trackpad, an extended hold on a touch screen or touch pad, and the like), as shown in FIG. 3D. In some examples, a user may wish to consume only a portion of the text content 312 using the reading assistant tool. As shown in FIG. 3E, the reading assistant tool may be launched in response to user selection (for example, highlighting) of a portion of the text content 312, and selection of the reading assistant tool from a menu 346, for example a browser application menu, displayed in response to an input from an input device. In some examples, the reading assistant tool may be launched in response to user selection of the reading assistant tool from a browser application menu in the form of a drop down menu of the utility menu control icon 324. In some examples, the reading assistant tool may be launched in response to user selection manipulation of a reading assistant icon or key provided on an input device such as a keyboard or a touchscreen interface.

In some examples, the reading assistant may be launched in accordance with previously stored user settings or set user preferences. For example, the reading assistant tool may be launched automatically, i.e., without additional user action, or without additional user intervention. For example, in some implementations, the reading assistant tool may be automatically launched in response to navigation to certain, specified websites, for any/all websites including content that is distillable by the reading assistant tool, in response to detection of certain types of content, and the like. Such preferences may be previously set stored and associated with a user account or user profile, accessible via the user icon 322. In some examples, such settings may include instructions that launch the reading assistant tool for specific websites designated (for example, by URL, by name, and the like) by the user, for all websites having content that is distillable by the reading assistant tool, for certain types of content designated by the user, for any clearly distillable content presented in the browser content window 320, and the like. In some examples, preferences for how the content is customized or modified can be selected by the user after the reading assistant tool is launched via, for example, a reading assistant toolbar 355 presented together with the content to be modified. In some examples, preferences related to the manner in which content is modified or customized may be previously set and stored by the user, and saved, for example, in association with a user account or user profile accessible via the user icon 322.

Figure 3F:
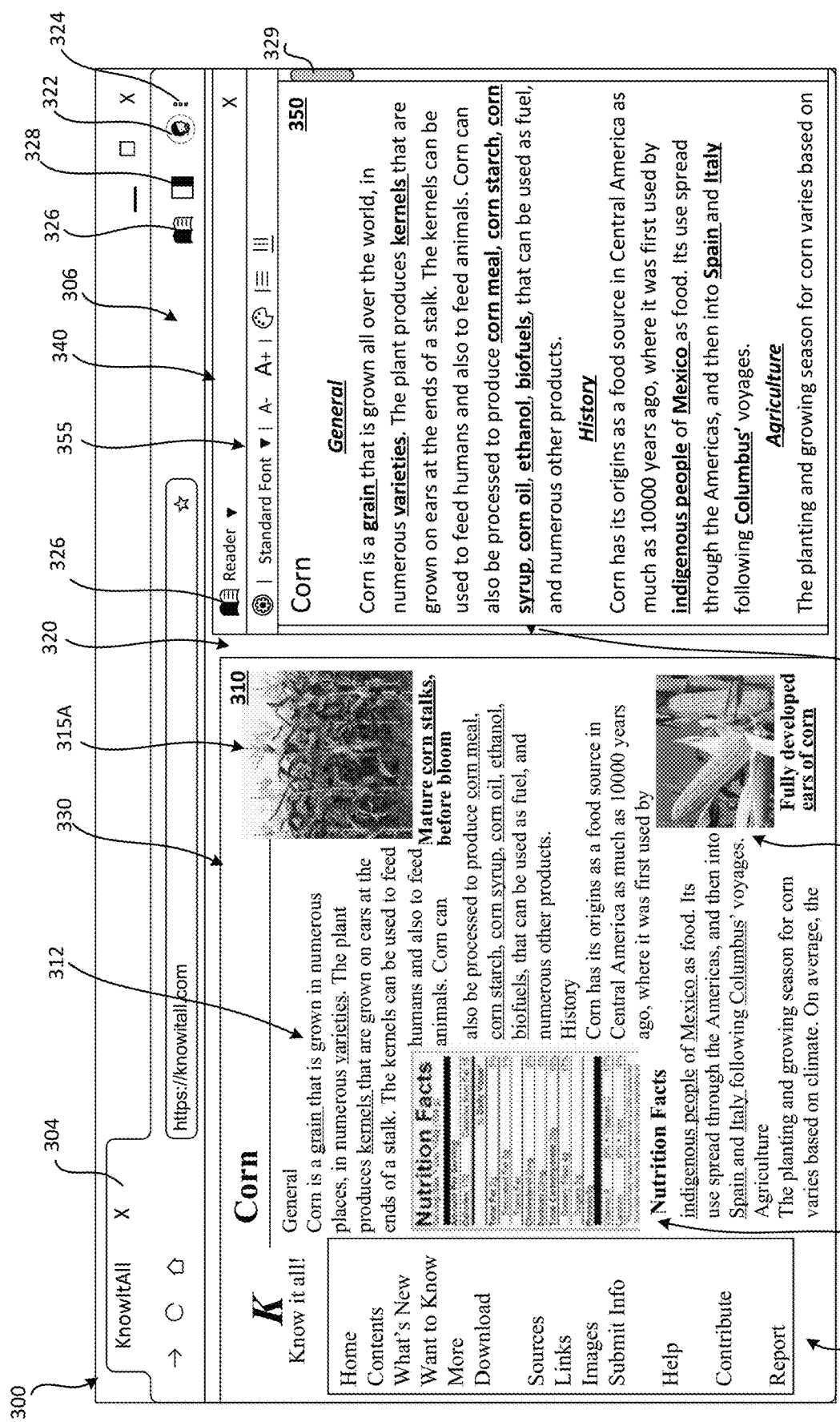
Figure 3G:
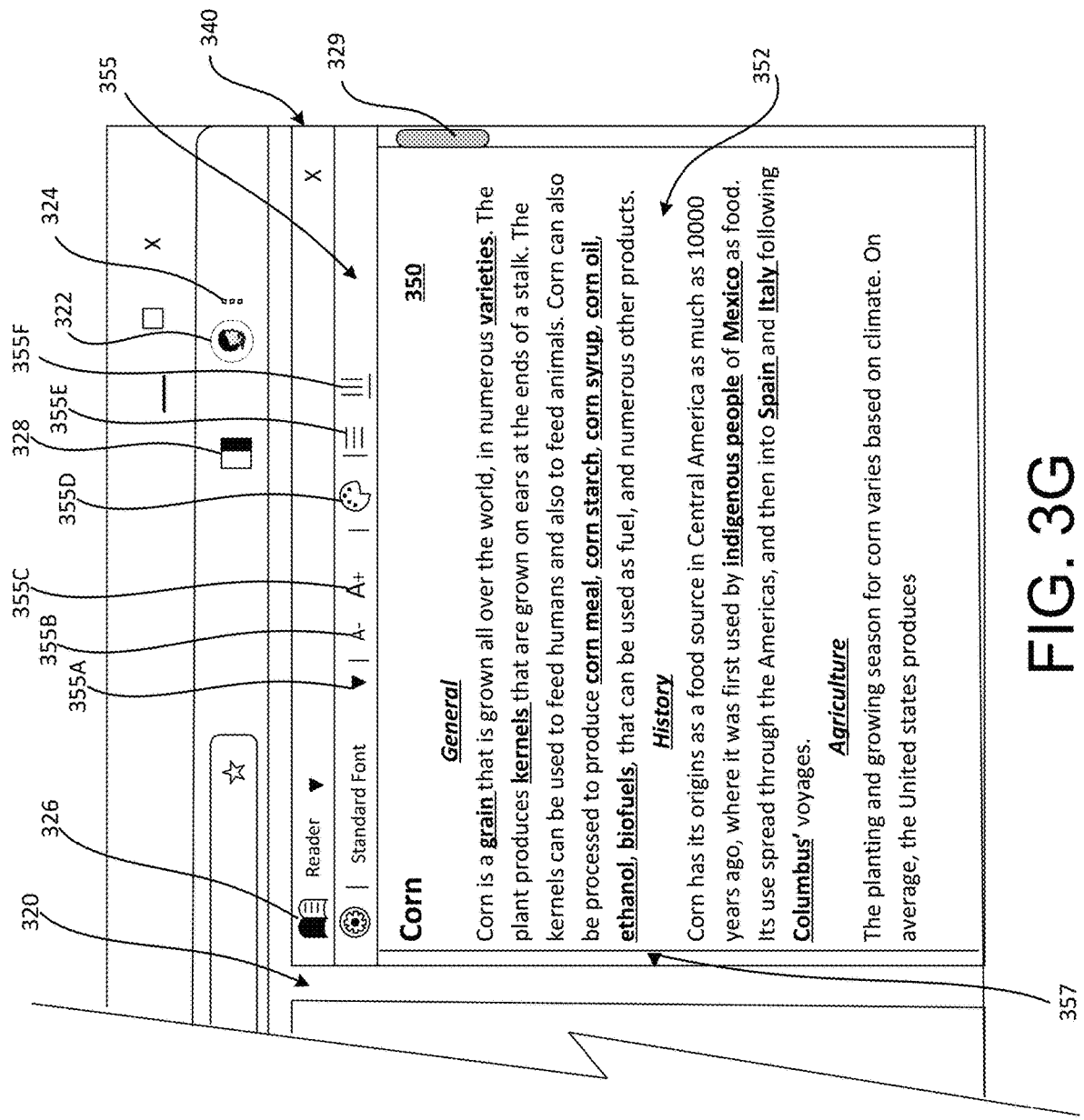
Figure 3H:
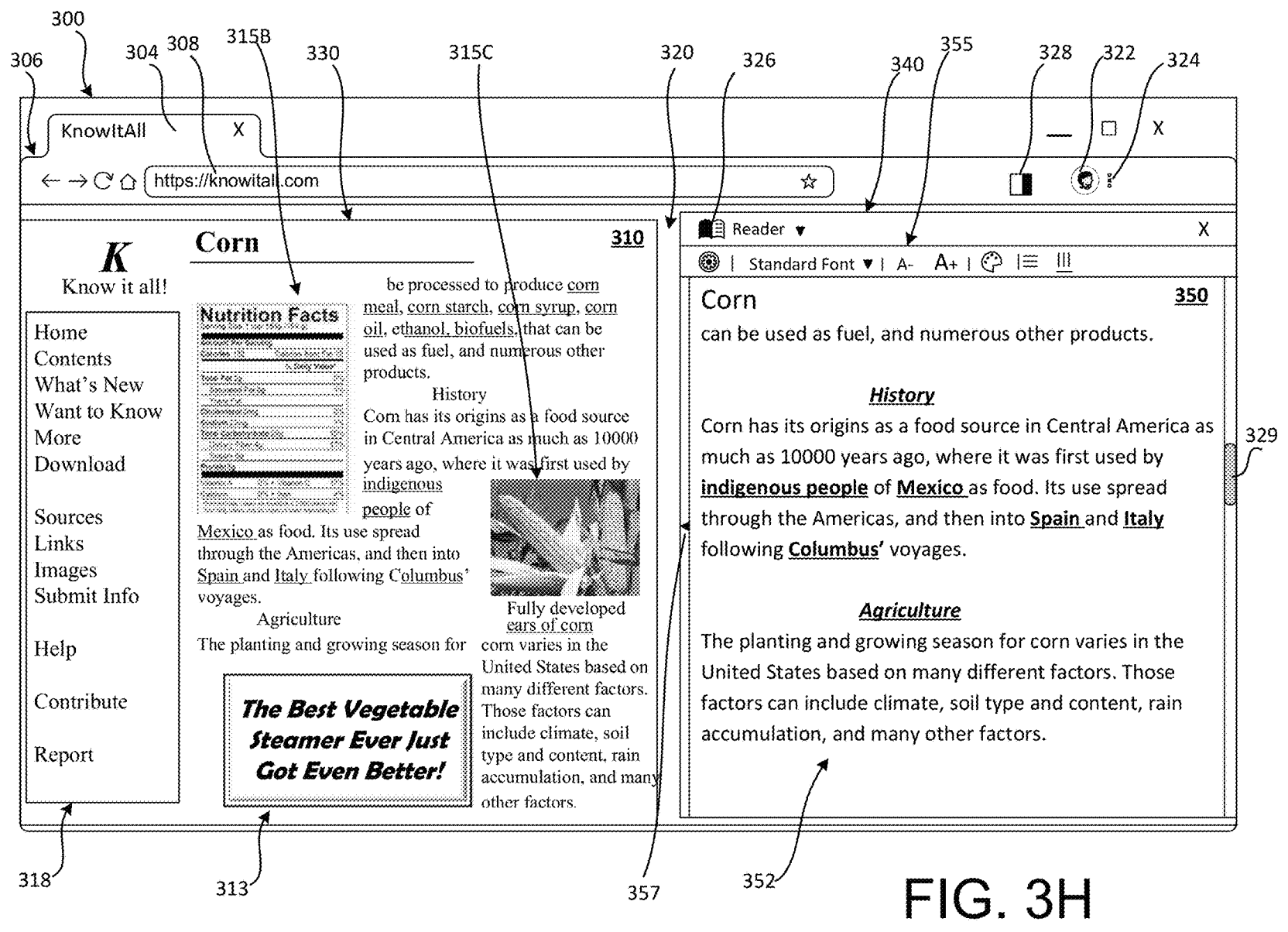

FIGS. 3F-3H illustrate an example reader view generated by a reading assistant tool of the example computing device 210. For example, the reader view may be generated by the reading assistant module 233 of the browser application 232, and output by, or displayed by, one of the output devices 212 of the computing device 210. As shown in FIG. 3F, in some examples, launching of the reading assistant tool may cause a first content pane 330 and a second content pane 340 to be displayed in the browser content window 320. In some examples, the original content 310 may be displayed in the first content pane 330. In some examples, modified content 350 may be displayed in the second content pane 340. The modified content 350 may be a customized, or modified, presentation of the original content 310. As noted above, the modified content 350 may be generated in accordance with user settings and/or preferences. The user settings and/or preferences may be based on various factors such as, for example, the user's learning style, the user's reading and/or comprehension capabilities, language skills, and the like. In the example shown in FIGS. 3F and 3G, in generating the modified content 350, the original content 310 has been decluttered to remove the image content 315, so that only modified text content 352 is included in the modified content 350 presented in the second content pane 340. That is, in the example shown in FIGS. 3F and 3G, the image content 315 (for example, a first image content item 315A, a second image content item 315B, and a third image content item 315C) and the tabular content 318 has been eliminated in the generation of the modified content 350, so that the modified content 350 includes only the modified text content 352, presented in a format that has been customized based on the user's preferences.

As noted above, in some examples, modification of the original text content 312 to generate the modified text content 352 may be done in accordance with previously set and stored user preferences. The previously stored user preferences may include, for example, previously set selections for font type and/or size and/or color, background color, line spacing and the like. In some examples, preferences for how the original, unmodified content 310 is customized or modified can be selected by the user after the reading assistant tool is launched via, for example, the reading assistant toolbar 355 included in the second content pane 340. As shown in FIGS. 3F and 3G, the example reading assistant toolbar 355 includes various icons providing for the adjustment and selection of various characteristics to be applied in the modification of the original text content 312. In some examples, the icons can include, for example, a font type selector 355A, font size selectors 355B and 355C, a font color and/or background color selector 355D, a line spacing selector 355E, a pitch selector 355F, and the like. In some examples, the second content pane 340 includes an adjustment bar including an adjustment selector 357. The adjustment selector 357 may provide for user adjustment of a size of the second content pane 340. For example, the user may manipulate the adjustment selector 357 (via, for example, an input device such as a mouse, a touch on a touchscreen or a touchpad and the like) to adjust a width of the second content pane 340 (and a corresponding width of the first content pane 330) as the input device is moved.

In some examples, the reading assistant tool (for example, through operation of the reading assistant module of the browser application 232) may detect and extract text content from the original content 310 (for example, through operation of the text extraction module 235 of the browser application 232). The extracted text may be processed in accordance with an established accessibility tree to generate the modified text content 352. In some examples, the accessibility tree contains semantic roles and layout information of each tree node. Thus, the accessibility tree may form the basis for the data model for the extraction of text content from the original content 310. While the document object model (DOM) contains some semantic information, such as, for example, the identification of paragraph nodes defined with a <p> tag, and the like, the accessibility tree contains more extensive semantic information, providing for the more effective extraction and distillation of text content. Examples of the semantic information included in the accessibility tree include accessible rich internet application (ARIA) landmarks such as headers (known as ARIA banners), footers (known as ARIA contentinfo), and main text. Further, the DOM does not contain layout information defining the bounds of each element positioned on the web page. These types of elements, which can be provided by the accessibility tree, are useful in the machine learning model extraction to inform where nodes are in relation to each other. The modified text content 352 may be generated and presented in the second content pane 340 of the browser content window 320 in accordance with user preferences (for example, in accordance with selected user preferences for font type/size/color, background color/spacing, pitch and the like implemented via the formatting module 237 of the browser application 232).

In the example shown in FIGS. 3F and 3G, the modified content 350 presented in the second content pane 340 is positioned next to, or side by side, with the original, unmodified content 310 in the first content pane 330. This side by side positioning of the first content pane 330 and the second content pane 340 may help the user to maintain context between the modified content 350 and the original, unmodified content 310. As noted above, in some examples, scrolling of the modified content 350 in the second content pane 340 may be synchronized with scrolling of the original, unmodified content 310 in the first content pane 330. Synchronizing, or anchoring, of the modified content 350 with the original, unmodified content 310, even when scrolling through the content 310, 350, may further enable the user to maintain context with the original, unmodified content 310 while scrolling and consuming the modified content 350.

In some examples, the synchronizing of the scrolling of the modified content 350 in the second content pane 340 with the original content 310 in the first content pane 330 may be implemented via, for example, the synchronizing module 239 of the browser application 232. In some examples, bounding boxes are assigned to text elements. Text elements may include, for example, text characters, words, sections of content that are primarily characters used in the language of the content. Text elements can include sections of content including individual characters, words, paragraphs and the like. In some examples, bounding boxes are assigned to or associated with text characters and/or words and/or sections of text of the original text content 312 of the original content 310 presented in the first content pane 330, e.g., as part of the rendering process. The bounding boxes may be represented as nodes in a document object model (DOM) tree or an accessibility tree. The text of these bounding boxes may be assigned to or associated with text characters and/or words and/or sections of text of the modified text content 352 presented in the second content pane 340. Thus, the modified text content 352 may be anchored with (assigned to, associated with) the one or more bounding boxes associated with the corresponding portion of the original text content 312. With the text content 312 of the original content 310 and the modified text content 352 anchored in this manner, user manipulation of the scroll control icon 329, causes scrolling the modified text content 352, and corresponding synchronized scrolling of the original content 310. The corresponding synchronized scrolling of the original content 310 includes scrolling of the text content 312, as well as scrolling of the image content 315/the image content items 315A, 315B, 315C. In some examples, scrolling may be implemented through user manipulation of other types of input devices such as, for example, directional keys of a keyboard, touch and drag inputs on a touchpad or touchscreen, manipulation of a scroll wheel of a mouse, and the like. Similarly, the synchronized scrolling of content can be initiated in the original content 310 presented in the first content pane 330, and the modified text content 351 presented in the second content pane 340 can be scrolled together with the original content 310 in the first content pane 330.

In the example arrangement shown in FIG. 3H, the user has manipulated the scroll control icon 329, from a first position shown in FIGS. 3E and 3F, to a second position shown in FIG. 3H. User manipulation of the scroll control icon 329 in this manner has caused scrolling of the modified text content 352 presented in the second content pane 340, and corresponding synchronized scrolling of the original content 310 in the first content pane 330. In the scrolled arrangement shown in FIG. 3H, both the text content 312 and the image content 315 of the original content 310 has scrolled, in coordination with the scrolling of the modified text content 352, such that the first image content item 315A is no longer visible in the first content pane 330. In this example, a promotional content item 313 is now visible in the original content 310 presented in the first content pane 330, along with an additional portion of the original text content 312. The additional portion of the original text content 312 has been modified, reformatted, and included in the modified text content 352 presented in the second content pane 340; however, the promotional content item 313 is not included in the modified content 350 presented in the second content pane 340, consistent with the previously selected and stored user preferences.

In the example described above with respect to FIGS. 3A-3H, the web page includes content in the form of main text content that can be identified and analyzed, for example, using an accessibility tree as noted above. For example, web pages that present content such as articles, papers, blogs, and the like can be identified by analyzing accessibility tree information. These types of distillable web pages, presenting this type of content, can be distilled by the reading assistant tool, and presented in a reader view as described above. Some web pages do not include this type of main text content. For example, some web pages include content that may be identified as tabular content, or tabular information, alone or together with other types of content that is not identified as main text content (for example, email interfaces, spreadsheet applications, calendar or scheduling pages, and the like). These types of non-distillable web pages may be processed differently by the reading assistant tool, so that the results presented to the user in the reader view address the needs of the user, and allow the user to more easily consume the content.

Figure 4A:
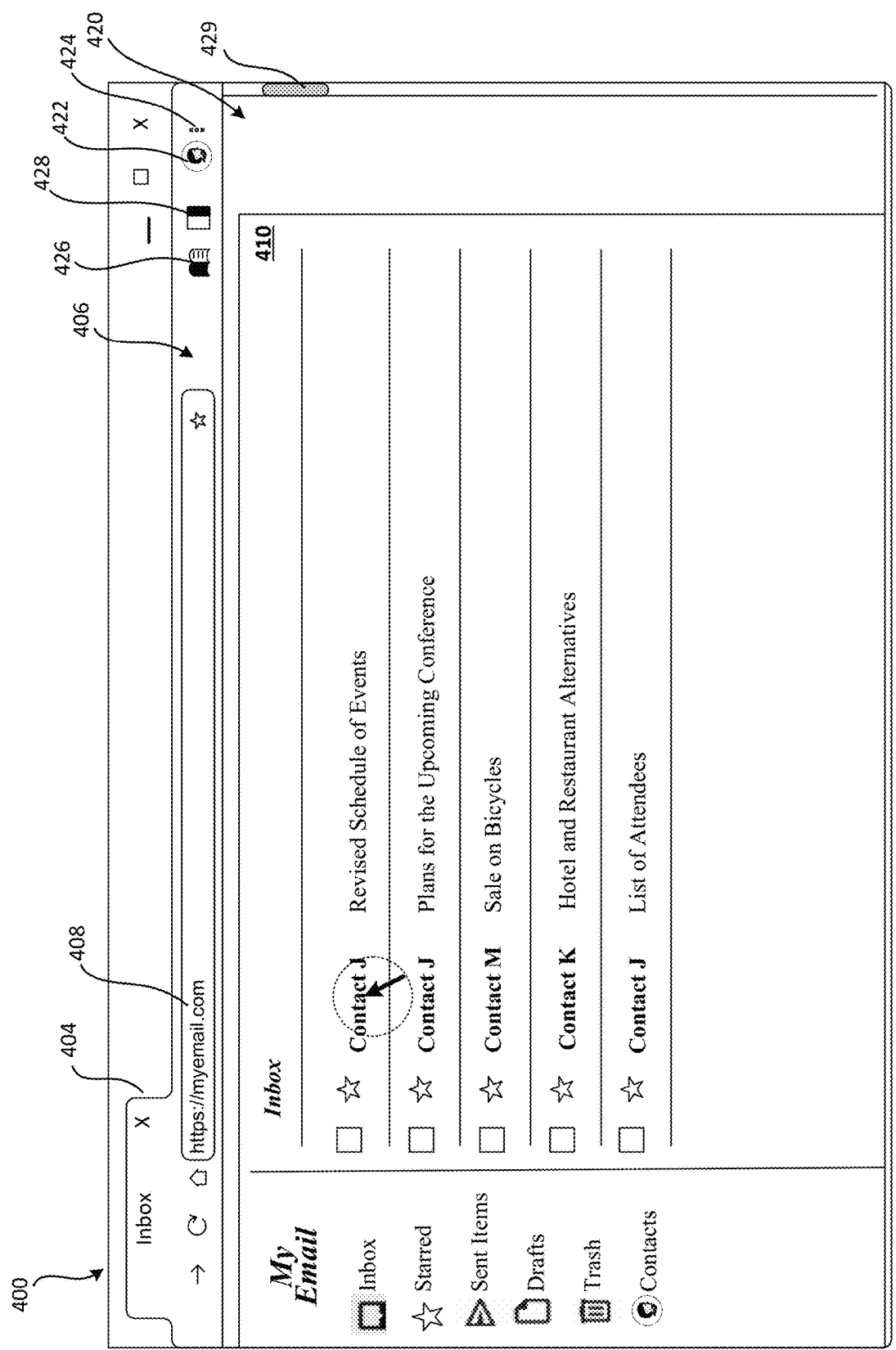
FIGS. 4A and 4B illustrate an example browser application user interface including content displayed in a browser content window.

FIG. 4A illustrates an example browser interface (UI) 400, representing a web page for an email application. As with the example browser UI 300 described above, the example UI 400 may generated and rendered by a browser application (for example, the browser application 232 described above with respect to FIG. 2, or other such browser application) executing in an operating system (for example, the operating system 220 described above with respect to FIG. 2, or other such operating system) of a computing device (for example, the computing device 210 described above with respect to FIG. 2, or other computing device). The example UI 400 includes one browser tab 404, with browser content 410 in the form of an email inbox presented in a browser content window 420 associated with the browser tab 404, simply for ease of discussion and illustration. The browser content 410 may be provided by, for example, the additional resources 250 (for example, a server hosting a website or web application) described above with respect to FIG. 2, and rendered by the browser application for output by the computing device. The example UI 400 shown in FIG. 4A includes an address bar area 406, with the address (i.e., the URL) of the web page displayed in an address input area 408 of the address bar area 406. A user icon 422 is displayed in the address bar area 406 to identify a user account, or a user profile, associated with the current browser session. A utility menu control icon 424 may provide for access to secondary actions and tools. A scroll control icon 429 may be provided along one or more peripheral portions of the browser content window 420, for user scrolling through content 410 presented in the browser content window 420. In some examples, a reading assistant control icon 426 can be included in the address bar area 406. In some examples, in response to detection of non-distillable content output in the browser content window 420, the reading assistant control icon 426 may be omitted/not displayed. In some examples, a side panel control icon 428 can be selected to cause a side panel, or a second viewing pane, to be presented in the browser content window 420. Functionality of the icons/controls provided in association with the example UI 400 may be similar to that which is described above with respect to FIGS. 3A-3G, and thus duplicative detailed description will be omitted.

In the example shown in FIG. 4A, the example content 410 represents an email interface, including a listing of email correspondence in a user inbox. In some examples, a page type associated with the web page content presented in the example web browser UI 400 may be determined, to determine that the example content 410 includes non-distillable content. The web page presented in the example browser UI 400 may be determined to be a non-distillable page, based on the lack of text-intensive sections of text content that could be distilled into simplified content for consumption by the user. Existing reading modes may be unavailable, or unable to distill this type of content, and thus would not be capable of providing the user with a simplified, more easily consumable presentation of the content. The reading assistant tool, in accordance with implementations described herein, may still provide the user with options for distilling content included in a web page considered to be a non-distillable page.

Figure 4B:
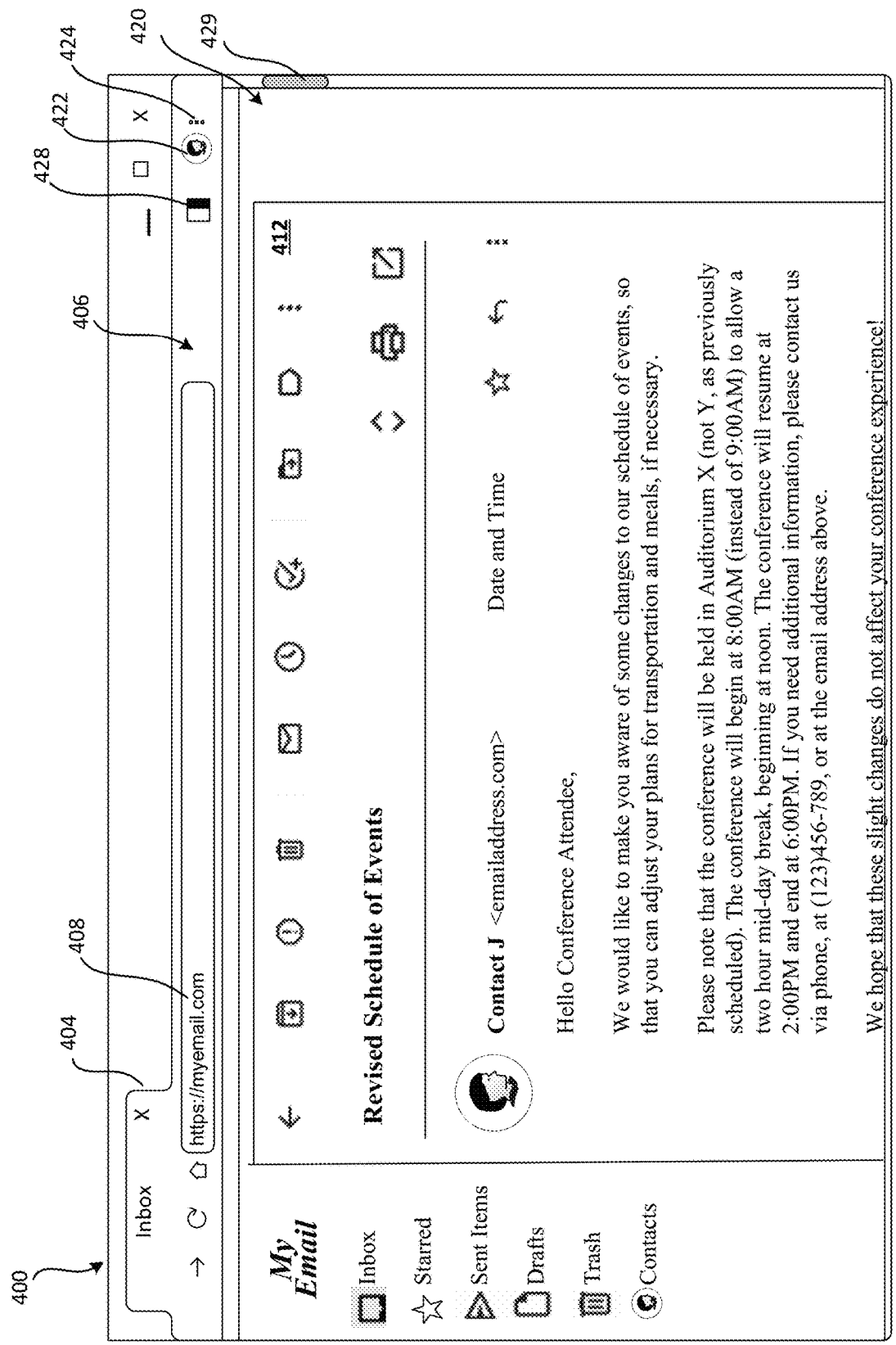

In response to selection of one of the content items within the content presented in the browser content window 420 (for example, a link to the first email item in the listing of email items in the inbox), example content 412, in the form of the content of the selected email item, is displayed in the browser content window 420, as shown in FIG. 4B. Analysis of the example content 410 shown in FIG. 4A, and the example content 412 shown in FIG. 4B, using the accessibility tree, via, for example, the text extraction module 235 of the browser application 232, may determine that the content 410 of the web page (i.e., the email interface) and the content 412 including the selected email item, as well as various other links, entry fields, control items and the like shown in FIG. 4B, is not readily distillable. For example, due to the tabular format of the text, listings of links, entry fields, control items, and the like, standard distillation of the content 410 shown in FIG. 4A, and/or the content 412 shown in FIG. 4B, is not likely to produce modified text that is easily consumable by the user. In some examples, in response to the determination that the web page displayed in the browser content window 420 is not readily distillable, the reading assistant control icon 426 may be omitted/not displayed in the address bar area 406 of the browser tab 404. Omission of the reading assistant control icon 426 in the address bar area 406 of the browser tab 404 may provide an indication to the user that the web page and associated content presented in the browser content window 420 is not distillable. The reading assistant control icon 426 is included in FIG. 4A, simply for purposes of discussion and illustration.

Figure 4C:
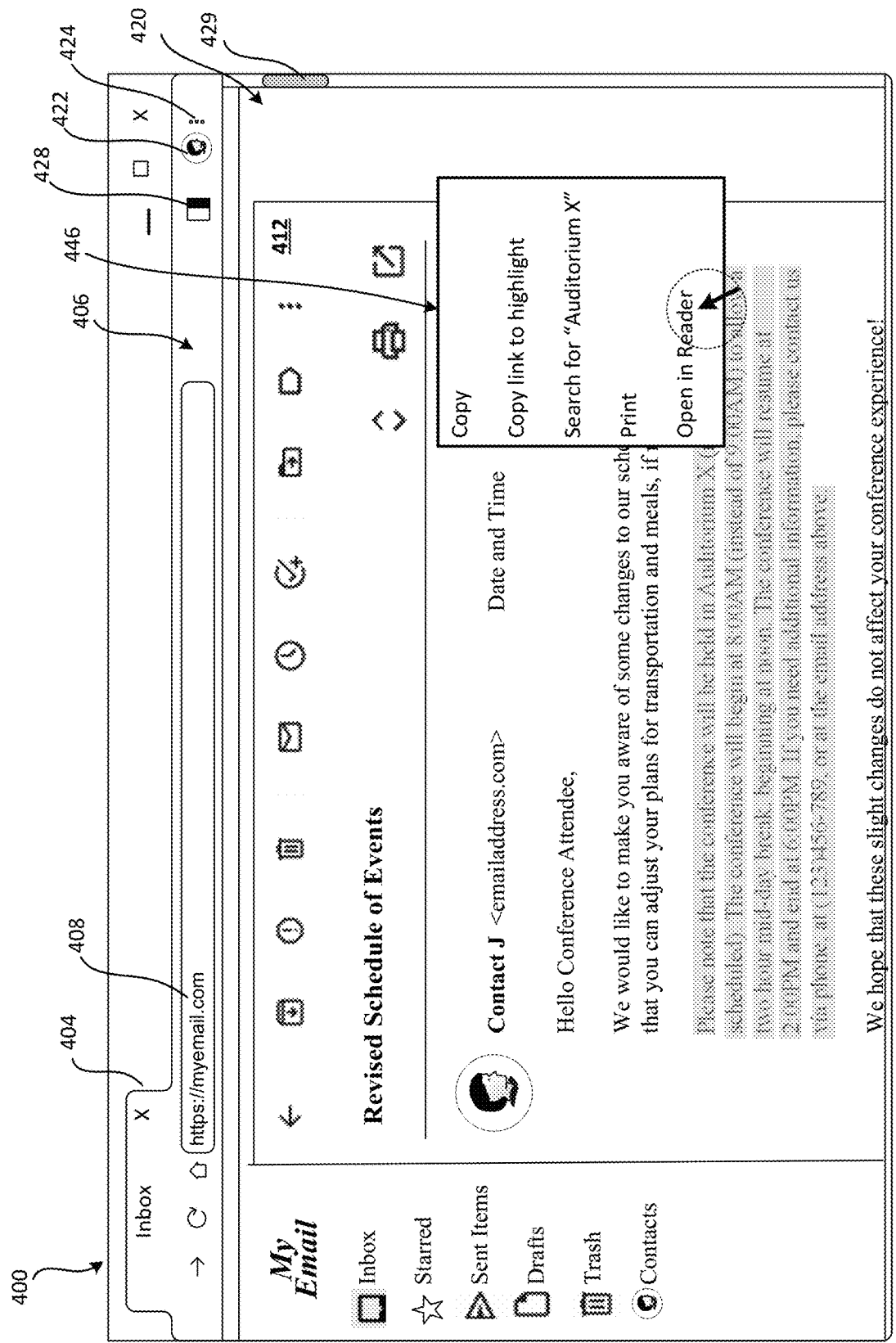
FIG. 4C illustrates selection of a reading assistant tool in the example browser application user interface shown in FIGS. 4A and 4B.
Figure 4D:
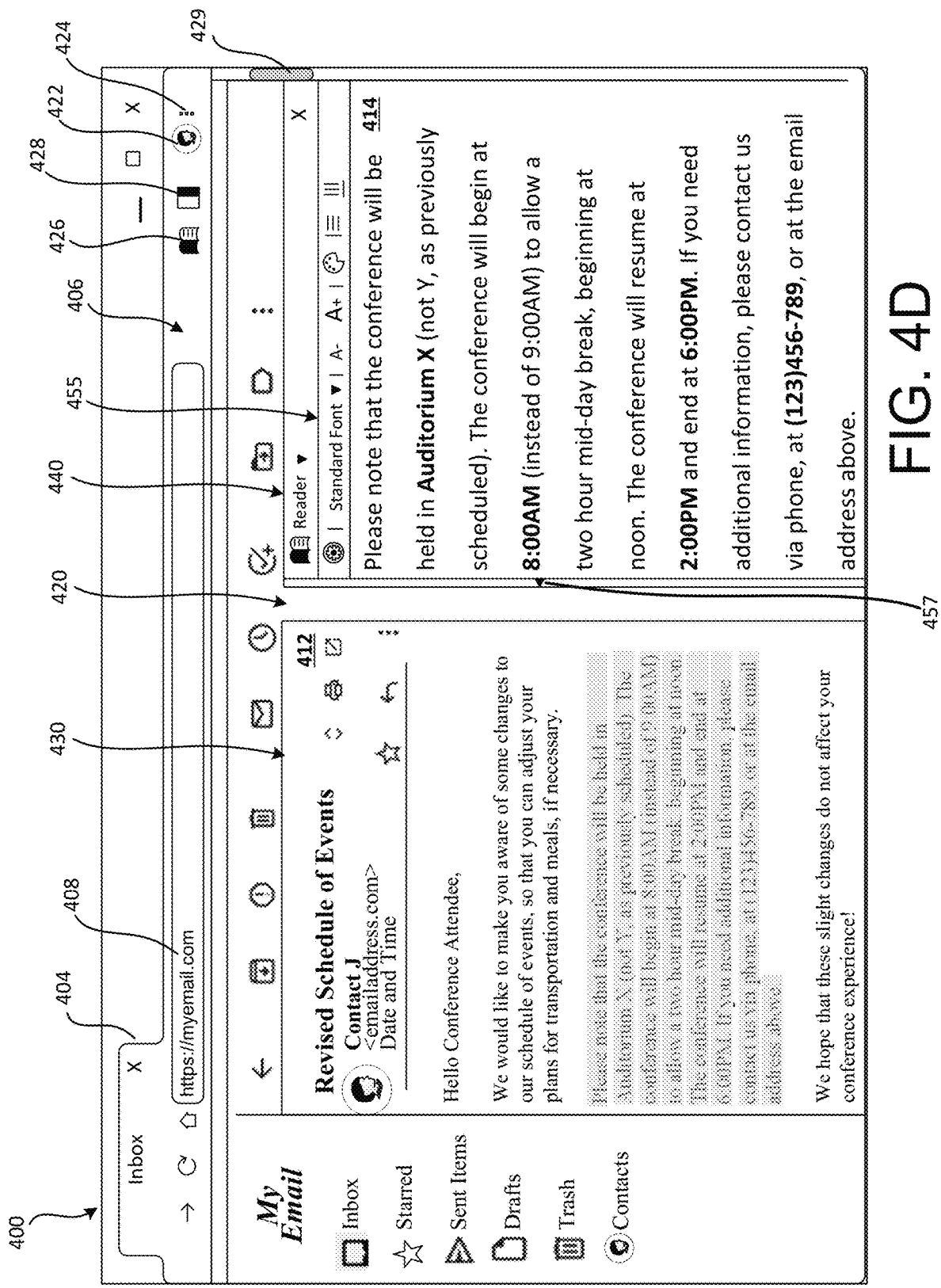
FIG. 4D illustrates features of a reader view generated by the reading assistant tool and presented in a browser content window of the example browser application user interface shown in FIGS. 4A and 4B.

As discussed above, users, particularly users experiencing reading and/or comprehension and/or learning and/or language challenges, may find the content 410 shown in FIG. 4A and/or the content 412 shown in FIG. 4B difficult to consume in the form in which it is presented in the example browser content window 420. The user may benefit from the ability to consume the content 410 and/or the content 412 in a form that is tailored, or customized, for the user's preferences and capabilities, so that the content 410 and/or the content 412 can be more easily consumed and understood. In a situation in which the reading assistant tool is unable to readily segregate and/or extract text and/or readily distill content into a form that is easily consumable by the user, the user may still apply the reading assistant tool to pertinent portions of the content. For example, as shown in FIG. 4C, the reading assistant tool may be launched in response to user selection (for example, highlighting) of a portion of the content 412, for example, a portion of the content 412 of particular interest to the user. The user may select the reading assistant tool from a menu 446, for example, a browser application menu, displayed in response to an input from an input device (i.e., a right click on a mouse, a tap on a trackpad, an extended hold on a touch screen or touch pad, entry of shortcut keys on a keyboard, and the like). In this example, a reader view as shown in FIG. 4D may be presented in the browser content window 420 in response to launching the reading assistant tool. The reader view may be generated by the reading assistant module 233 of the browser application 232, and output by, or displayed by, one of the output devices 212 of the computing device 210. In some examples, launching the reading assistant tool and generating the reader view may cause a first content pane 430 and a second content pane 440 to be presented side by side in the browser content window 420. The original, unmodified content 412 may be presented in the first content pane 430, and the customized, or modified content 414 may be presented in the second content pane 440. In this example, the modified content 414 represents a customized, or modified version of the example portion of the original content 412 that was selected by the user as shown in FIG. 4C.

As noted above, in some examples, preferences for how the original content 412 is customized or modified to produce the modified content 414 can be selected by the user after the reading assistant tool is launched via, for example, a reading assistant toolbar 455 presented together with the content to be modified in the second content pane 440. In some examples, preferences related to the manner in which content is modified or customized may be previously set by the user. Such preferences may be saved, for example, in association with a user account or user profile accessible via the user icon 422. The user preferences may be based on various factors such as, for example, the user's learning style, the user's reading and/or comprehension capabilities, language skills, and the like. The previously stored user preferences may include, for example, previously stored selections for font type and/or size and/or color, background color, line spacing and the like. In the example shown in FIG. 4D, in generating the modified content 414, the selected portion of the original text content 312 is presented in a format that has been customized based on the user's preferences, and without additional entry fields, control icons, links and the like which would otherwise cause distraction and adversely impact the user's consumption of the content. In some examples, the second content pane 440 includes an adjustment bar including an adjustment selector 457 for user adjustment of a size of the second content pane 440. For example, the user may manipulate the adjustment selector 457 (via, for example, an input device such as a mouse, a touch on a touchscreen or a touchpad and the like) to adjust a width of the second content pane 440 (and a corresponding width of the first content pane 430) as the input device is moved.

Figure 5:
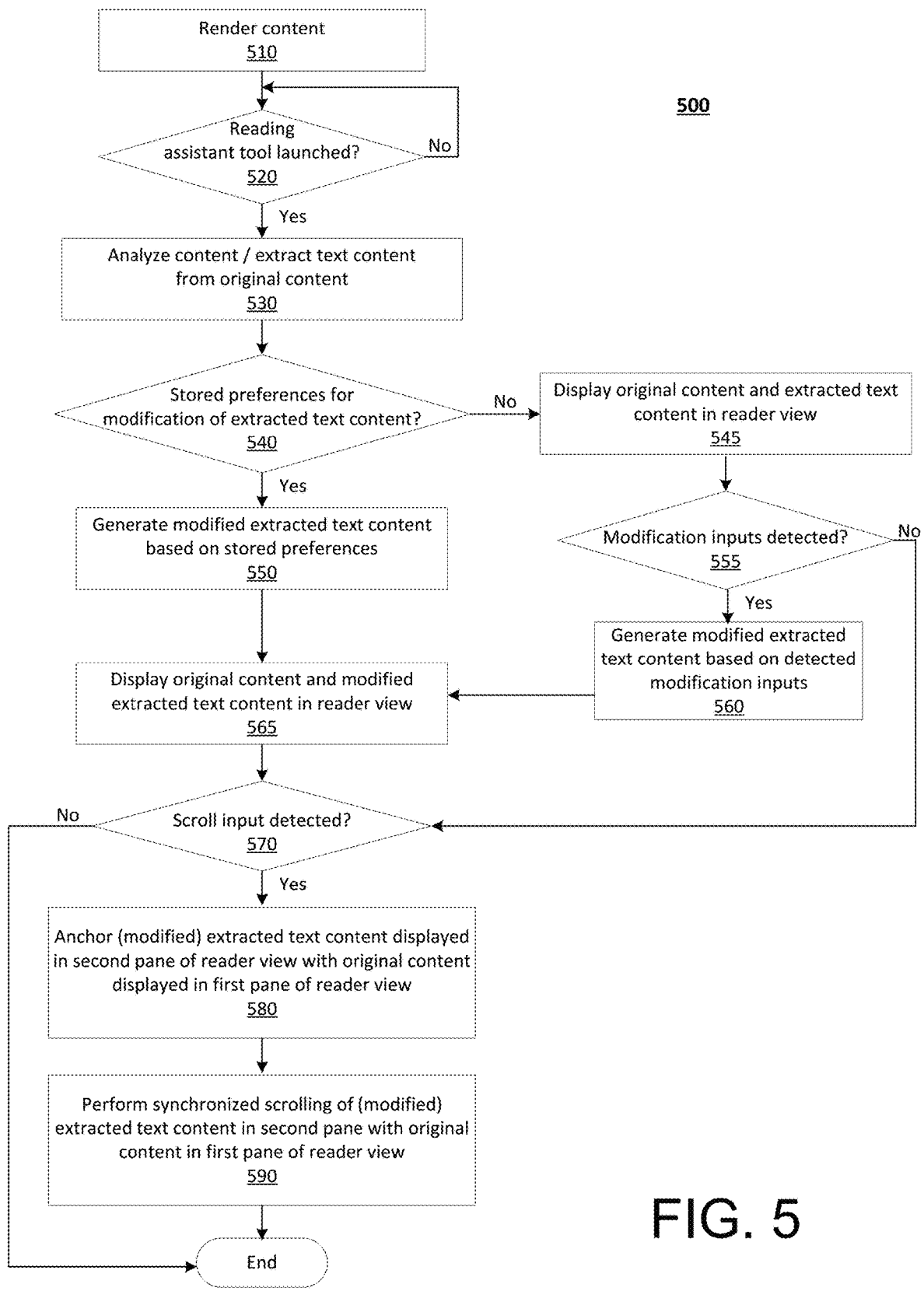
FIG. 5 is a flowchart of an example method, in accordance with implementations described herein.

FIG. 5 is a flowchart of an example method 500, in accordance with implementations described herein. The method 500 may be performed by a browser application, such as the browser application 232 described above with respect to FIG. 2. The method 500 may provide for the launch of a reading assistant tool and output of content, for example, by a display device of a computing device such as the computing device 210 described above with respect to FIG. 2, in a reader view presented in a browser user interface. The reader view may allow both original, unmodified content, and extracted text content, to be presented in side by side reading panes, so that the user can maintain the originally intended context when consuming the extracted text content. The appearance of the extracted text content can be modified in accordance with user preferences to facilitate the user's reading and comprehension of the extracted text content. Scrolling of the extracted text content may be synchronized, or anchored with scrolling of the original content in its original form, to maintain the originally intended context even as the content is scrolled. The extraction of text content from the original content, the modification of the appearance of the extracted text content may reduce visual distraction, and allow the user to view the extracted text content in a form that accommodates the user's specific capabilities. The side by side presentation of the original, unmodified content and the extracted text content in a form, i.e., an appearance that has been modified based on user preferences, and the synchronized scrolling of the original unmodified content and the extracted/reformatted text content, may facilitate the user's reading and comprehension of the text, while also maintaining an improved understanding through the connection with original, unmodified content.

The browser application may render content for output to a user (block 510) via, for example, a display device of a computing device. The content may be a presentation of a web page, including text content, image content, links, input fields, control devices, and the like. The rendered content may be output in a browser content window of a browser user interface generated by the browser application. The browser application may include a reading assistant tool implemented by a reading assistant module of the browser application. The reading assistant tool may be launched in numerous different ways. In some examples, the reading assistant tool may be proactively launched, without specific user input or intervention, for any web pages output by the browser application for a particular user, or for designated web pages, or for designated types of content. In some examples, the user may initiate the launch of the reading assistant tool, for example, through the selection of a reading assistant control icon available in the browser user interface and/or in a side panel application within the browser content window and/or selection from within input device control menus and browser control menus.

In response to launching the reading assistant tool (block 520), the content of the output in the browser content window by the browser application may be analyzed, and text content extracted from the content (block 530). The content may include, for example, image content, links, input fields, control devices, and other such items in addition to the text content. In some examples, the content may be analyzed using, for example, an accessibility tree, to determine a type of web page presented in the browser user interface, and a degree to which the associated content is distillable in its current form. Text content may be extracted by, for example, a text extraction module, such as the text extraction module 235 of the browser application 232 described above with respect to FIG. 2.

The extracted text may be customized, or modified, in accordance with the preferences of a particular user, and to accommodate the reading and/or comprehension and/or learning and/or language capabilities of the user. The extracted text may be formatted, by for example a formatting module such as the example formatting module 237 of the browser application described above with respect to FIG. 2, to incorporate preferences such as font type and/or size and/or color, background color, spacing, pitch, and the like, that will make the extracted text easier for the user to consume. In some examples, these preferences may be previously stored, and associated with a user account or user profile.

The formatting module 237 may generate modified extracted text content (block 550) in response to detection of previously stored preferences for the modification of the extracted text content (block 540). The modified extracted text content may be displayed, together with the original, unmodified content, in the reader view within the browser content window (block 565). In particular, the original, unmodified content may be displayed in a first content pane, and the modified extracted text content may be displayed in a second content pane presented within the browser content window. The second content pane may be positioned beside the first content pane in the browser content window, so that the modified extracted text content may be viewed alongside, or together with, the original content.

If the user preferences for the formatting/modification of the extracted text content have not been previously stored (block 540), extracted text content may be displayed, together with the original content, in the reader view within the browser content window (block 545). The original content may be displayed in the first content pane, and the extracted text content may be displayed in the second content pane, positioned beside the first content pane, in the reader view presented within the browser content window. In some examples, a reading assistant toolbar such as, for example the reading assistant toolbar 355 described above with respect to FIGS. 3A-3G and/or the reading assistant toolbar 455 described above with respect to FIGS. 4A-4D, may be provided by the browser application. The reading assistant toolbar may allow for the formatting, or reformatting of the extracted text content to suit the needs of a particular user. In response to modification inputs detected via the reading assistant toolbar (block 555), the formatting module 237 may generate modified extracted text content (block 560). The modified extracted text content may be displayed in the first content pane, and the modified extracted text content may be displayed in the second content pane, positioned beside the first content pane, in the reader view presented within the browser content window (block 565), so that the modified extracted text content may be viewed alongside, or together with, the original content In response to a scroll input that causes scrolling of the (modified or unmodified) extracted text content displayed in the second pane (block 570), the system may anchor the (modified or unmodified) text content in the second content pane with the original, unmodified content in the first content pane (block 580). Similarly, a scroll input that causes scrolling of the original, unmodified content in the first content pane, the system may anchor the unmodified content in the first content pane with the (modified or unmodified) text content in the second content pane. In some examples, a synchronizing module, such as the synchronizing module 239 of the browser application 232 described above with respect to FIG. 2, may anchor bounding boxes assigned to or associated with text characters and/or words and/or sections of text of the original, unmodified content in the first pane with bounding boxes associated with corresponding text characters and/or words and/or sections of text of the (modified or unmodified) extracted text content in the second pane of the reader view. With the original, unmodified content and the (modified or unmodified) extracted text content anchored in this manner, user manipulation of a scrolling device (for example, a scroll control icon displayed in the browser user interface, directional keys of a keyboard, wheel of a mouse, drag input on a touchpad or touchscreen, and the like), the system perform synchronized scrolling of the (modified or unmodified) extracted text content and the original, unmodified content (block 590).

In one general aspect, a computer-implemented method includes extracting, by a text extraction module of a browser application executing on a computing device, text content included in browser content displayed by the browser application; generating modified text content based on the extracted text content; and rendering, by the browser application, a reader view for display of the modified text content together with the browser content. The rendering may include rendering a first content pane displaying the browser content; and rendering a second content pane beside the first content pane, the second content pane displaying the modified text content. The computer implemented method may also include providing, for display on a display device of the computing device, the reader view including the second content pane beside the first content pane.

In some implementations, generating the modified text content includes at least one of modifying a format of the extracted text content in accordance with previously stored user settings related to displaying of the modified text content in the second content pane; or modifying the format of the extracted text content in response to a user input detected at a reading assistant toolbar of the browser application. Modifying the format of the extracted text content may include modifying at least one of a font type, a font size, a font color, a background color, a pitch, or a line spacing of the extracted text content.

In some implementations, the computer-implemented method includes rendering, by the browser application, the browser content; analyzing, by a reading assistant module of the browser application, the browser content; and determining a page type associated with the browser content based on the analyzing, including determining that the browser content is associated with a distillable page in response to detection of extractable text content in the browser content. In some implementations, the computer-implemented method includes launching a reading assistant tool, including at least one of launching the reading assistant tool in response to determining that the browser content is associated with the distillable page; or launching the reading assistant tool in response to a user input selecting the reading assistant tool from a browser application menu. In some implementations, the computer-implemented method includes determining that the browser content is associated with a non-distillable page; detecting a user input selecting a section of text content from the browser content; and launching a reading assistant tool in response to a user input selecting the reading assistant tool from a browser application menu. In some implementations, generating the modified text content includes generating the modified text content based on the section of text content selected by the user input.

In some implementations, the computer-implemented method includes detecting a scroll input for scrolling of the modified text content displayed in the second content pane; scrolling the modified text content displayed in the second content pane in response to the scroll input; and scrolling the browser content displayed in the first content pane in response to the scroll input.

In some implementations, the computer-implemented method includes detecting a scroll input for scrolling of the browser content displayed in the first content pane; scrolling the browser content displayed in the first content pane in response to the scroll input; and scrolling the modified text content displayed in the second content pane in response to the scroll input. Scrolling the browser content displayed in the first content pane may include synchronizing the scrolling of the browser content displayed in the first content pane with the scrolling of the modified text content displayed in the second content pane. Synchronizing the scrolling of the browser content displayed in the first content pane with the scrolling of the modified text content displayed in the second content pane may include associating a first bounding box assigned to a text element in browser content displayed in the first content pane with a second bounding box assigned to a corresponding text element in the modified text content displayed in the second content pane; and performing the synchronizing of the scrolling based on the associating of the first bounding box and the second bounding box.

In another general aspect, a non-transitory computer-readable medium stores instructions that, when executed by at least one processor of a computing device, cause the at least one processor to extract, by a text extraction module of a browser application executing on the computing device, text content included in browser content displayed by the browser application; generate modified text content based on the extracted text content; and render a reader view for display of the browser content together with the modified text content by the browser application, including render a first content pane displaying the browser content; and render a second content pane beside the first content pane, the second content pane displaying the modified text content. The instructions may also cause the at least one processor to provide, for display on a display device of the computing device, the reader view including the first content pane and the second content pane.

In some implementations, the instructions cause the at least one processor to detect previously stored user settings related to displaying of the modified text content in the second content pane; modify a format of the extracted text content in accordance with the previously stored user settings; detect a user input at a reading assistant toolbar of the browser application; and modify the format of the extracted text content in response to the user input detected at the reading assistant toolbar. In some implementations, the instructions cause the at least one processor to render, by the browser application, the browser content; analyze, by a reading assistant module of the browser application, the browser content; and determine a page type associated with the browser content, including determining that the browser content is associated with a distillable page in response to detection of extractable text content in the browser content.

In some implementations, the instructions cause the at least one processor to launch a reading assistant tool, including at least one of launch the reading assistant tool in response a determination that the browser content is associated with the distillable page; or launch the reading assistant tool in response to a user input selecting the reading assistant tool from a browser application menu. In some implementations, the instructions cause the at least one processor to determine that the browser content is associated with a non-distillable page; detect a user input selecting a section of text content from the browser content; and launch a reading assistant tool in response to a user input selecting the reading assistant tool from a browser application menu. In some implementations, the instructions cause the at least one processor to generate the modified text content based on the section of text content selected by the user input.

In some implementations, the instructions cause the at least one processor to detect a scroll input for scrolling of the modified text content displayed in the second content pane; scroll the modified text content displayed in the second content pane in response to the scroll input; and scroll the browser content displayed in the first content pane in response to the scroll input. In some implementations, the instructions cause the at least one processor to synchronize the scrolling of the browser content displayed in the first content pane with the scrolling of the modified text content displayed in the second content pane, including associate a first bounding box assigned to a text element in browser content displayed in the first content pane with a second bounding box assigned to a corresponding text element in the modified text content displayed in the second content pane; and synchronize the scrolling based on the associating of the first bounding box and the second bounding box.

In some implementations, the browser content includes the text content and at least one of image content, tabular content, links, input fields, or browser control devices, and wherein the instructions cause the at least one processor to modify at least one of a font type, a font size, a font color, a background color, a pitch, or a line spacing of the extracted text content.

In another general aspect, a computing system includes a processor; a display; and a memory storing instructions that, when executed by the processor, cause a browser application executing on the computing system to perform operations.

The operations may include extracting, by a text extraction module of the browser application, text content included in browser content displayed on the display; generating modified text content based on the extracted text content; rendering a reader view for display of the browser content together with the modified text content, including rendering a first content pane displaying the browser content; and rendering a second content pane beside the first content pane, the second content pane displaying the modified text content; and providing, for display on the display, the reader view including the first content pane and the second content pane.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the implementations disclosed herein unless the element is specifically described as "essential" or "critical."

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Although certain example computer-implemented methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

In one aspect, a non-transitory computer-readable medium stores instructions that, when executed by a processor on a receiving computing device, causes the receiving computing device to perform any of the methods disclosed herein.

In one aspect, a computing device can be configured with at least one processor and memory storing instructions that, when executed by the at least one processor, performs any of the methods disclosed herein.

What is claimed is:

1. A computer-implemented method, comprising:
extracting, by a text extraction module of a browser application executing on a computing device, text content included in browser content displayed by the browser application, the browser content including the text content and at least one of image content, tabular content, links, input fields, or browser control devices;
generating modified text content based on the extracted text content;
rendering, by the browser application, a reader view, including:
rendering a first content pane displaying the browser content including the text content and additional content, the additional content including at least one of the image content, tabular content, links, input fields, or browser control devices; and
rendering a second content pane beside the first content pane, the second content pane displaying the modified text content and omitting the additional content included in the browser content;
providing, for display on a display device of the computing device, the reader view including the second content pane beside the first content pane; and
synchronizing a scrolling of the browser content including the text content and the additional content in the first content pane with a scrolling of the modified text content in the second content pane in response to a scroll input detected at one of the first content pane or the second content pane, including:
associating a first bounding box assigned to a text element and the additional content in the browser content displayed in the first content pane with a second bounding box assigned to a corresponding text element in the modified text content displayed in the second content pane;
anchoring the second bounding box with the first bounding box; and
synchronizing the scrolling based on the anchoring of the second bounding box with the first bounding box such that the modified text content displayed in the second content pane remains anchored with the corresponding text content and additional content displayed in the first content pane during the scrolling.

2. The computer-implemented method of claim 1, wherein generating the modified text content includes at least one of:
modifying a format of the extracted text content in accordance with previously stored user settings related to displaying of the modified text content in the second content pane; or
modifying the format of the extracted text content in response to a user input detected at a reading assistant toolbar of the browser application.

3. The computer-implemented method of claim 2, wherein modifying the format of the extracted text content includes modifying at least one of a font type, a font size, a font color, a background color, a pitch, or a line spacing of the extracted text content.

4. The computer-implemented method of claim 1, further comprising:
rendering, by the browser application, the browser content;
analyzing, by a reading assistant module of the browser application, the browser content; and
determining that the browser content is associated with a distillable page in response to detection of extractable text content in the browser content.

5. The computer-implemented method of claim 4, further comprising launching a reading assistant tool, including at least one of:
launching the reading assistant tool in response to determining that the browser content is associated with the distillable page; or
launching the reading assistant tool in response to a user input selecting the reading assistant tool from a browser application menu.

6. The computer-implemented method of claim 4, further comprising:
determining that the browser content is associated with a non-distillable page;
detecting a user input selecting a section of text content from the browser content; and
launching a reading assistant tool in response to a user input selecting the reading assistant tool from a browser application menu.

7. The computer-implemented method of claim 6, wherein generating the modified text content includes generating the modified text content based on the section of text content selected by the user input.

8. A non-transitory computer-readable medium storing instructions that, when executed by at least one processor of a computing device, cause the at least one processor to:
extract, by a text extraction module of a browser application executing on the computing device, text content included in browser content displayed by the browser application, the browser content including the text content and additional content, the additional content including at least one of image content, tabular content, links, input fields, or browser control devices;
generate modified text content based on the extracted text content;
render a reader view for display of the browser content together with the modified text content by the browser application, including:
render a first content pane displaying the browser content including the text content and the additional content; and
render a second content pane beside the first content pane, the second content pane displaying the modified text content and omitting the additional content included in the browser content;
provide, for display on a display device of the computing device, the reader view including the first content pane and the second content pane; and
synchronize a scrolling of the browser content, including the text content and the additional content in the first content pane, with a scrolling of the modified text content in the second content pane, in response to a scroll input detected at one of the first content pane or the second content pane, including:
associate a first bounding box assigned to a text element and the additional content included in the browser content displayed in the first content pane with a second bounding box assigned to a corresponding text element in the modified text content displayed in the second content pane;
anchor the second bounding box with the first bounding box; and
synchronize the scrolling based on the anchoring of the first bounding box and the second bounding box such that the modified text content displayed in the second content pane remains anchored with the corresponding text content and additional content displayed in the first content pane during the scrolling.

9. The non-transitory computer-readable medium of claim 8, wherein the instructions cause the at least one processor to:
detect previously stored user settings related to displaying of the modified text content in the second content pane;
modify a format of the extracted text content in accordance with the previously stored user settings;
detect a user input at a reading assistant toolbar of the browser application; and
modify the format of the extracted text content in response to the user input detected at the reading assistant toolbar.

10. The non-transitory computer-readable medium of claim 8, wherein the instructions cause the at least one processor to:
render, by the browser application, the browser content;
analyze, by a reading assistant module of the browser application, the browser content; and
determine that the browser content is associated with a distillable page in response to detection of extractable text content in the browser content.

11. The non-transitory computer-readable medium of claim 10, wherein the instructions cause the at least one processor to launch a reading assistant tool, including at least one of:
launch the reading assistant tool in response a determination that the browser content is associated with the distillable page; or
launch the reading assistant tool in response to a user input selecting the reading assistant tool from a browser application menu.

12. The non-transitory computer-readable medium of claim 10, wherein the instructions cause the at least one processor to:
determine that the browser content is associated with a non-distillable page;
detect a user input selecting a section of text content from the browser content; and
launch a reading assistant tool in response to a user input selecting the reading assistant tool from a browser application menu.

13. The non-transitory computer-readable medium of claim 12, wherein the instructions cause the at least one processor to generate the modified text content based on the section of text content selected by the user input.

14. The non-transitory computer-readable medium of claim 8, wherein the instructions cause the at least one processor to modify at least one of a font type, a font size, a font color, a background color, a pitch, or a line spacing of the extracted text content.

15. A computing system, comprising:
a processor;
a display; and
a memory storing instructions that, when executed by the processor, cause a browser application executing on the computing system to perform operations, including:
extracting, by a text extraction module of the browser application, text content included in browser content displayed on the display, the browser content including the text content and additional content, the additional content including at least one of image content, tabular content, links, input fields, or browser control devices;
generating modified text content based on the extracted text content;
rendering a reader view for display of the browser content together with the modified text content, including:
rendering a first content pane displaying the browser content; and
rendering a second content pane beside the first content pane, the second content pane displaying the modified text content and omitting the additional content included in the browser content;
providing, for display on the display, the reader view including the first content pane and the second content pane; and
synchronizing a scrolling of the browser content including the text content and the additional content in the first content pane with a scrolling of the modified text content in the second content pane in response to a scroll input detected at one of the first content pane or the second content pane including:
associating a first bounding box assigned to a text element and the additional content included in the browser content displayed in the first content pane with a second bounding box assigned to a corresponding text element in the modified text content displayed in the second content pane;
anchoring the second bounding box with the first bounding box; and
synchronizing the scrolling based on the anchoring of the second bounding box with the first bounding box such that the modified text content displayed in the second content pane remains anchored with the corresponding text content and additional content displayed in the first content pane during the scrolling.

* * * * *